United States Patent
Choi et al.

(10) Patent No.: US 9,215,284 B2
(45) Date of Patent: Dec. 15, 2015

(54) METHOD AND APPARATUS FOR PROVIDING SERVICE BASED ON COMPONENT USING PERSONAL NETWORK

(75) Inventors: Seok-Hoon Choi, Seoul (KR); Se-Hee Han, Seoul (KR); Ho-Yeon Park, Seoul (KR)

(73) Assignee: Samsung Electronics Co., Ltd., Suwon-si (KR)

(*) Notice: Subject to any disclaimer, the term of this patent is extended or adjusted under 35 U.S.C. 154(b) by 346 days.

(21) Appl. No.: 13/567,454

(22) Filed: Aug. 6, 2012

(65) Prior Publication Data
US 2013/0036181 A1 Feb. 7, 2013

(30) Foreign Application Priority Data
Aug. 5, 2011 (KR) ........................ 10-2011-0078374

(51) Int. Cl.
| | |
|---|---|
| G06F 15/16 | (2006.01) |
| G06F 15/177 | (2006.01) |
| H04L 29/08 | (2006.01) |
| H04W 4/20 | (2009.01) |
| H04W 4/00 | (2009.01) |
| H04L 12/28 | (2006.01) |

(52) U.S. Cl.
CPC ............ H04L 67/16 (2013.01); H04L 12/2807 (2013.01); H04L 12/2825 (2013.01); H04L 67/10 (2013.01); H04W 4/008 (2013.01); H04W 4/203 (2013.01); H04L 67/303 (2013.01)

(58) Field of Classification Search
CPC ..... H04W 4/008; H04W 4/203; H04W 4/001; H04W 88/06; H04W 88/16; H04L 67/104; H04L 67/1046; H04L 65/102; H04L 69/08
USPC ......... 709/217, 219, 223, 225, 249, 201, 202, 709/203, 204, 206, 218, 220, 221, 222
See application file for complete search history.

(56) References Cited

U.S. PATENT DOCUMENTS

| | | | |
|---|---|---|---|
| 2009/0319613 A1 | 12/2009 | Hjelm et al. | |
| 2010/0284390 A1* | 11/2010 | Lee et al. | 370/338 |
| 2011/0090886 A1* | 4/2011 | Park et al. | 370/338 |

(Continued)

FOREIGN PATENT DOCUMENTS

KR 10-2011-0041995 A 4/2011

OTHER PUBLICATIONS

OMA, "Converged Personal Network Service Requirements", Candidate Version 1.0, Nov. 17, 2009, Open Mobile Alliance (OMA), OMA-RD-CPNS-V1_0-20091117-C.*

(Continued)

*Primary Examiner* — Edward Kim
(74) *Attorney, Agent, or Firm* — Jefferson IP Law, LLP

(57) ABSTRACT

Provided are a method and an apparatus for providing a service based on Personal Network Entity (PNE) components and resources within an apparatus without implementing a function of generating and managing a service group only in a case in which a plurality of PNEs provide a similar function by providing a function of generating and managing the service group based on components included in a network apparatus or resources with the apparatus in an environment providing a Converged Personal Network Service (CPNS) service. Accordingly, it is possible to avoid inefficient overlapping developments and operations and prevent resources from being wasted.

20 Claims, 8 Drawing Sheets

(56) References Cited

U.S. PATENT DOCUMENTS

| | | | |
|---|---|---|---|
| 2011/0093704 A1* | 4/2011 | Park et al. | 713/168 |
| 2011/0183760 A1* | 7/2011 | Kim et al. | 463/40 |
| 2011/0207403 A1* | 8/2011 | Kim et al. | 455/41.1 |
| 2011/0212689 A1* | 9/2011 | Kim et al. | 455/41.1 |
| 2011/0307620 A1* | 12/2011 | Park et al. | 709/229 |
| 2012/0066332 A1* | 3/2012 | Deprun | 709/206 |

OTHER PUBLICATIONS

S.K. Oh, OMA Converged Personal Network Service, Altgen Fusion in mobile & industry, Aug. 2008.

Converged Personal Network Service Requirements, Candidate Version 1.0, Open Mobile Alliance, OMA-RD-CPNS-V1_0-2011-503-C, May 3, 2011.

* cited by examiner

METHOD AND APPARATUS FOR PROVIDING SERVICE BASED ON COMPONENT USING PERSONAL NETWORK

PRIORITY

This application claims the benefit under 35 U.S.C. §119(a) of a Korean patent application filed on Aug. 5, 2011 in the Korean Industrial Property Office and assigned Serial No. 10-2011-0078374, the entire disclosure of which are hereby incorporated by reference.

BACKGROUND OF THE INVENTION

1. Field of the Invention

The present invention relates to a method and an apparatus for a personal network service. More particularly, the present invention relates to a method and an apparatus for providing a service based on a function component included in electronic devices belonging to a personal network.

2. Description of the Related Art

With an exponential increase in the use of Consumer Electronics (CE) enabling near field communication such as an MP3 player, a Portable Multimedia Player (PMP), a game machine, a netbook, and the like, users seek a method to conveniently download content.

In general, the user searches for content reproducible in the consumer electronics through an interne by using, for example, a Personal Computer (PC) and then downloads the found content. Subsequently, when the consumer electronics are connected to the PC by using a dedicated cable, the consumer electronics can download the content from the PC. Then, the consumer electronics can reproduce the corresponding content only via such a process. Currently, there is a method by which content can be shared between devices by using a Bluetooth scheme instead of using such a cable.

However, a method by which the consumer electronics directly access a wide area communication network is still extremely limited. For example, some of the consumer electronics can access the wide area communication network only when the consumer electronics can use an interne through Wireless-Fidelity (Wi-Fi) in an area in which there is an Access Point (AP). Accordingly, a need for a method is increased to allow a device capable of performing the near filed communication but incapable of directly accessing the wide area communication network, that is, the consumer electronics to access the wide area communication network through a gateway and to use a service such as downloading a content and the like. In light of the need of the method, a Converged Personal Network Service (CPNS) is proposed.

The CPNS refers to a service in which one Personal Network (PN) including a combination of an apparatus playing a role of a gateway and consumer electronics reproducing an actual service and content is configured and then the consumer electronics receive the corresponding service or content by accessing a service/content providing server existing in a wide area communication network through the apparatus playing the role of the gateway.

In such a CPNS, apparatuses configuring the personal network are referred to as network apparatuses, an electronic apparatus playing the role of the gateway among the network apparatuses is referred to as a PN gateway, and an electronic apparatus connected to the PN gateway through near field communication to access the wide area communication network through the PN gateway is referred to as a Personal Network Entity (PNE). Further, the service or content provided by the service/content providing server can be transferred to the corresponding PN gateway (or personal network) by registering and managing the PN gateway, the PNE, and the personal network in the CPNS server.

FIG. 1 illustrates a construction of a Converged Personal Network Service (CPNS) system according to the related art.

Referring to FIG. 1, a CPNS system includes a service/content providing server 50, a CPNS server 40, PN gateways 10 and 60, and PNEs 20, 30, and 70.

A first personal network 80 is configured with the first PN gateway 10 as its center, and a second personal network 90 is configured with the second PN gateway 60 as its center. A particular service provided by the service/content providing server 50 or the CPNS server 40 may be provided in the unit of personal networks or in the unit of service groups.

The service group refers to a group including a plurality of network apparatuses among network apparatuses included in the personal network to provide a particular service in the unit of groups. The service group may include only network apparatuses belonging to one personal network or network apparatuses belonging to different personal networks 80 and 90, that is, the second PNE 30 and the third PNE 70 as shown in FIG. 1.

In general, the service group may include network apparatuses, which support the apparatus capability, capable of using the particular service, for example, PNEs in the CPNS and is designed such that a service and a content which each network device can provide in a CPNS environment may be shared and utilized.

As described above, when the related art based on the CPNS is used, it is possible to provide the service only according to the apparatus capability of the network apparatus included in the personal network. In other words, all network apparatuses should have similar apparatus capability in the related art based on the conventional CPNS.

Although the user is playing a particular game alone, the user may desire to play the game by using a plurality of network apparatuses. For example, the user may desire to play and control the game by using a portable terminal such as a smart phone, but receiving a game image and a game sound through a television set. In this case, the television set and the portable terminal can be paired as the service group. However, a particular game service cannot be provided in a form desired by the user through the pairing. Further, it is not possible to reconstruct hardware components included in each apparatus and resources within the apparatus in a form desired by the user.

For example, a hardware component of the smart phone may include a display module, a GPS module, a microphone module, and a mobile communication module, a resource of the smart phone may include an application, content and the like, and a hardware component of the television set may include a display module, a speaker module and the like. One service cannot be provided by combining such a hardware component and such a resource.

Further, a service provider (e.g., the CPNS server 40 or the service/content providing server 50) can recommend or provide only services which can be independently provided to respective network devices of the current personal network, respectively. Accordingly, there is no method to recommend a network device required for configuring a new service according to an analysis of user's behavior and an available service according to the network device.

Therefore, a need exists for a method and an apparatus for providing a service based on a hardware component included in a network device or a resource within the network device in an environment providing a CPNS.

The above information is presented as background information only to assist with an understanding of the present disclosure. No determination has been made, and no assertion is made, as to whether any of the above might be applicable as prior art with regard to the present invention.

SUMMARY OF THE INVENTION

Aspects of the present invention are to address the above-mentioned problems and/or disadvantages described below. Accordingly, an aspect of the present invention is to provide a method and an apparatus for providing a service based on a hardware component included in a network device or a resource within the network device in an environment providing a CPNS.

Another aspect of the present invention is to provide a method and an apparatus which can increase user's convenience and satisfaction.

In accordance with an aspect of the present invention, a method of providing a service based on a component included in each network apparatus connected to a personal network by a personal network gateway apparatus supporting a Converged Personal Network Service (CPNS) is provided. The method includes configuring a personal network including one or more apparatuses physically paired with the gateway apparatus through near field communication, wherein the configuring of the personal network comprises collecting information on a hardware component included in each of the one or more apparatuses and a software component indicating an application or a content stored in each of the one or more apparatuses, generating an inventory including information on a hardware component included in the personal network gateway apparatus, information on a software component included in the personal gateway apparatus, and the collected information, transmitting a personal network generation request message including the inventory and requesting a generation of the personal network including the one or more apparatuses to a CPNS server, when a personal network generation response message allowing the generation of the personal network is received from the CPNS server, transmitting the inventory to each of the one or more apparatuses, receiving service information including a list of services provided using a plurality of hardware components and software components included in the inventory and information on a hardware component and a software component related to each of the services from the CPNS server, and transmitting the service information to each of the one or more apparatuses.

Further, the method may further include receiving a service group establishment request message including a request for providing a particular service from a particular apparatus among the one or more apparatuses, information on a hardware component or a software component related to the particular service, information on member apparatuses to receive the particular service among the one or more apparatuses, and a request for generating a service group including the particular apparatus and the member apparatus, identifying whether each of the member apparatuses participate in the service group, transmitting the service group establishment request message to the CPNS server, and when a service group establishment response message allowing a generation of the service group is received from the CPNS server, providing the particular service to apparatuses included in the service group, wherein each of the member apparatuses is an apparatus including one or more of the hardware component and the software component related to the particular service.

In accordance with another aspect of the present invention, a personal network gateway apparatus for supporting a Converged Personal Network Service (CPNS) and for providing a service based on a component included in each network apparatus connected to a personal network is provided. The apparatus includes a near field communication unit, a wide area communication unit capable of accessing a wide area communication network, one or more hardware components, and a network manager for, in order to configure a personal network including one or more apparatuses physically paired through communication supported by the near field communication unit, collecting information on a hardware component included in each of the one or more apparatuses and a software component indicating an application or a content stored in each of the one or more apparatuses, generating an inventory including information on a hardware component included in the personal network gateway apparatus and a software component included in the personal gateway apparatus, and the collected information, and storing the generated inventory in a memory, transmitting a personal network generation request message including the inventory and requesting a generation of the personal network including the one or more apparatuses to a CPNS server through the wide area communication unit, when a personal network generation response message allowing the generation of the personal network is received from the CPNS server through the wide area communication unit, transmitting the inventory to each of the one or more apparatuses through the near field communication unit, receiving service information including a list of services provided using a plurality of hardware components and software components included in the inventory and information on a hardware component and a software component related to each of the services from the CPNS server through the wide area communication unit, and transmitting the service information to each of the one or more apparatuses through the near field communication unit.

In accordance with another aspect of the present invention, a method of providing a service to network apparatuses connected to a personal network based on a component included in each of the network apparatuses by a Converged Personal Network Service (CPNS) server supporting a CPNS is provided. The method includes receiving a personal network generation request message including an inventory including a request for generating a personal network including a plurality of apparatuses physically paired through near field communication and information on a hardware component included in each of the plurality of apparatuses and a software component indicating an application or a content stored in each of the plurality of apparatuses from a personal network gateway, when an authentication for each of the plurality of apparatuses is successfully performed, storing the inventory in a memory, generating a personal network generation response message allowing a generation of the personal network, and transmitting the generated personal network generation response message to the personal network gateway, and transmitting service information including a list of services which can be provided based on a plurality of hardware components and software components included in the inventory and information on a hardware component or a software component related to each of the services to the personal network gateway.

In accordance with another aspect of the present invention, a Converged Personal Network Service (CPNS) server apparatus for supporting a CPNS and for providing a service to network apparatuses connected to a personal network based on a component included in each of the network apparatuses is provided. The CPNS server apparatus includes a communication unit for performing communication with a personal network gateway apparatus, a memory for storing authentication information on apparatuses subscribing to the CPNS, and a service controller for receiving a personal network generation request message including an inventory including a request for generating the personal network including a plurality of apparatuses physically paired through near field communication and information on a hardware component included in each of the plurality of apparatuses and a software component indicating an application or a content stored in each of the plurality of apparatuses from the personal network gateway apparatus through the communication unit, when an authentication for each of the plurality of apparatuses is successfully performed with reference to the authentication information stored in the memory, storing the inventory in the memory, generating a personal network generation response message allowing a generation of the personal network, transmitting the generated personal network generation response message to the personal network gateway apparatus through the communication unit, and transmitting service information including a list of services which can be provided based on a plurality of hardware components and software components included in the inventory and information on a hardware component or a software component related to each of the services to the personal network gateway apparatus through the communication unit.

In accordance with another aspect of the present invention, a method of supporting a Converged Personal Network Service (CPNS) and providing a service based on a component included in each network apparatus connected to a personal network by electronic apparatuses connected to the personal network is provided. The method includes transmitting a personal network generation request message including a request for generation the personal network including one or more apparatuses physically paired with the electronic apparatuses through near field communication and information on a hardware component included in the electronic apparatus and a software component indicating an application or a content stored in each of the electronic apparatuses to a personal network gateway apparatus, receiving a personal network generation response message allowing a generation of the personal network and including an inventory including information on a hardware component included in each of a plurality of electronic apparatuses connected to the personal network and a software component included in each of the plurality of electronic apparatuses from the personal network gateway apparatus, and receiving service information including a list of services provided based on a plurality of hardware components and software components included in the inventory and information on a hardware component or a software component related to each of the services from the personal network gateway apparatus.

In accordance with another aspect of the present invention, an electronic apparatus for supporting a Converged Personal Network Service (CPNS) and for providing a service based on a component included in each network apparatus connected to a personal network is provided. The electronic apparatus includes a near field communication unit, one or more hardware components, and a network connection controller for transmitting a personal network generation request message including a request for generating the personal network including one or more apparatuses physically paired through near field communication supported by the near field communication unit and information on a hardware component included in the electronic apparatus and a software component indicating an application or a content stored in each electronic apparatus to a personal network gateway apparatus through the near field communication unit, receiving a personal network generation response message allowing a generation of the personal network and including an inventory including information on a hardware component included in each of a plurality of electronic apparatuses connected to the personal network and a software component included in each of the plurality of electronic apparatuses from the personal network gateway apparatus, storing the inventory in a memory, receiving service information including a list of services provided based on a plurality of hardware components and software components included in the inventory and information on a hardware component or a software component related to each of the services, and storing the received service information in the memory.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which.

Throughout the drawings, it should be noted that like reference numbers are used to depict the same or similar elements, features, and structures.

DETAILED DESCRIPTION OF EXEMPLARY EMBODIMENTS

Figure 1:
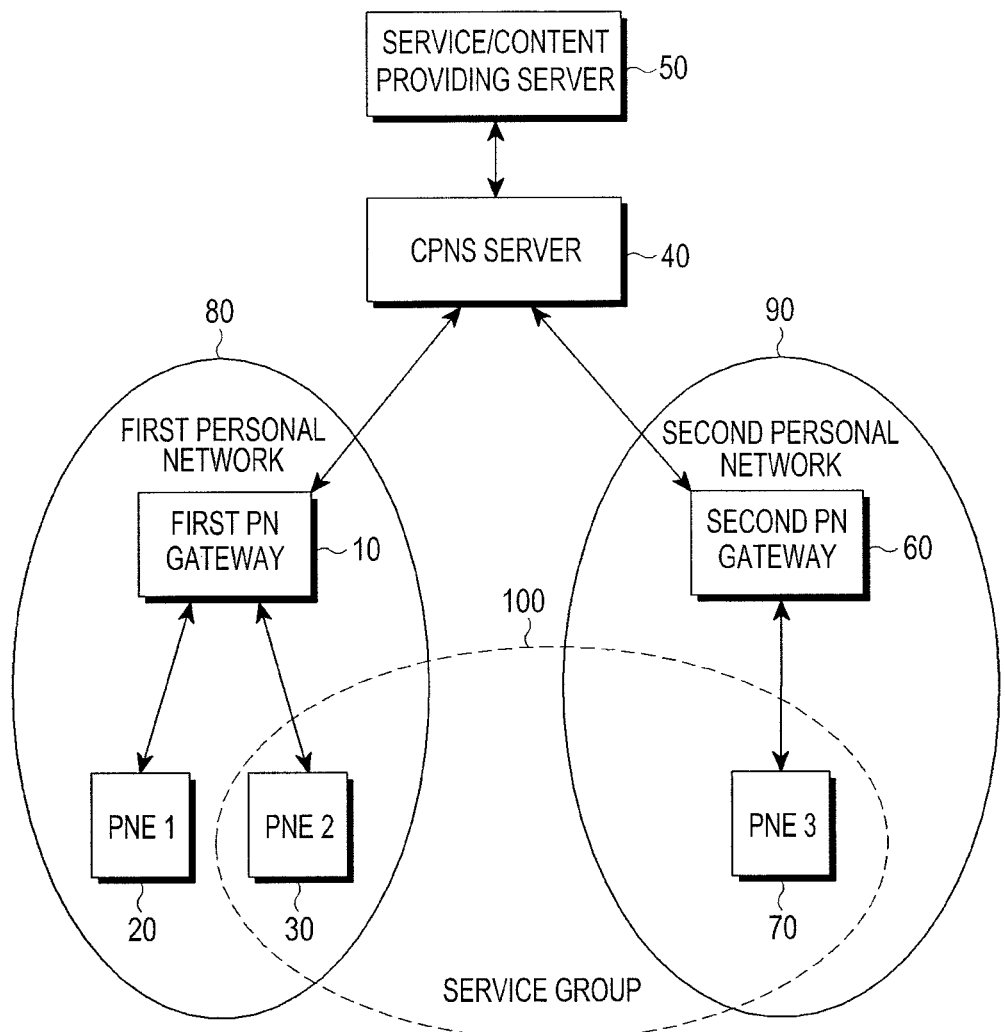
FIG. 1 illustrates a construction of a Converged Personal Network Service (CPNS) system according to the related art.

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

The detailed description which will be described later proposes exemplary embodiments of the present invention to solve the above-mentioned technical problem. Further, for the convenience of description, names of entities defined in the Converged Personal Network Service (CPNS) of Open Mobile Alliance (OMA) which is an application standard organization of mobile terminals will be used in the present invention, but the standard and names do not limit the present invention and are applicable to a system having a similar technical background.

Exemplary embodiments of the present invention provide a particular service or content based on a component (e.g., hardware component and software component) of each network apparatus included in a personal network in an environment providing the CPNS. For example, exemplary embodiments of the present invention provide the particular service by combining respective hardware components or respective software components of a plurality of network apparatuses. At this time, the plurality of network apparatuses are determined according to whether a component required for providing the particular service is included.

The hardware components are hardware elements included in the network apparatus in order to provide an inherent function of the network apparatus and are physically distinguishable. The software components are software resources of the network apparatus and refer to various types of applications or contents.

For example, when the network apparatus is a smart phone, the hardware component may be a touch panel module, a display module, a GPS module, a microphone module, a mobile communication module, a speaker module, a camera module, various types of sensors, and the like. Further, the software component may be a dynamic image codec application, an audio codec application, a game application, a web browser application, a document managing application (e.g., MS office), an SNS (Social Networking Service) application (e.g., facebook), a communication application (e.g., skype), and the like.

Accordingly, in exemplary embodiments of the present invention, a Personal Network (PN) gateway collects component information of a related Personal Network Entity (PNE) in an initial step of generating the personal network and provides the collected component information on the PNE to a CPNS server when a generation of the personal network is requested. At this time, component information of the PN gateway is also provided to the CPNS server. Further, the component information includes hardware component information and software component information.

The CPNS server allows the generation of the personal network and stores information on the personal network. Further, the CPNS server transfers service information on a providable component based service determined based on the component information received from the PN gateway. The PN gateway transfers the service information to a connected PNE. The service information includes an identifier of each service and a component related to each service, or information on the PNE.

The user can identify the service information through the PN gateway or the PNE and select a particular service. The PN gateway obtains the PNE's agreement in order to establish a service group including PNEs including components related to the particular service selected by the user, and then makes a request for providing the particular service and establishing the service group from the CPNS server.

For example, the PNE connected to the personal network may be a speaker which is a stereo music reproducing apparatus, an MP3 player, an audio system and the like, and the PN gateway may be a smart phone. As an example, a television includes a display module and a speaker module as the hardware component, and includes a reproduction application capable of reproducing a dynamic image as the software component therein. Further, it may be assumed that the stereo music reproducing apparatus includes a speaker module, and that the smart phone includes the above-mentioned hardware components and software components.

In this case, services which can be provided through the personal network may include, for example, a dynamic image service and an interne web service. The dynamic image service can be provided through the speaker module of the stereo music reproducing apparatus and the display module and the speaker module of the television. The interne web service can be provided through a web browser application and a touch panel module of the smart phone and the display module of the television.

When the user selects the dynamic image service, the CPNS server is requested to establish a service group including the television and the stereo music reproducing apparatus.

The CPNS server allows an establishment of the service group, stores information on the service group, and transfers a particular service or a content to the PN gateway as necessary. The PN gateway provides the particular service to a member PNE belonging to the service group.

Through an application of the above example, the CPNS server provides a dynamic image content to the smart phone, and the smart phone having received the dynamic image content provides the dynamic image content to the television after separating an image from audio. Further, the television reproduces the received image through the display module and outputs the audio through the speaker module. Furthermore, the smart phone transmits only an audio signal from the dynamic image content to the stereo music reproducing apparatus and allows the stereo music reproducing apparatus to output the audio signal. At this time, the audio output through the television and the audio signal output through the stereo music reproducing apparatus are synchronized and then output. Meanwhile, it is apparent that the smart phone provides the dynamic image content received from the CPNS server to the television without any separation between the image and the audio and allows the television to output the dynamic image content.

Figure 2:
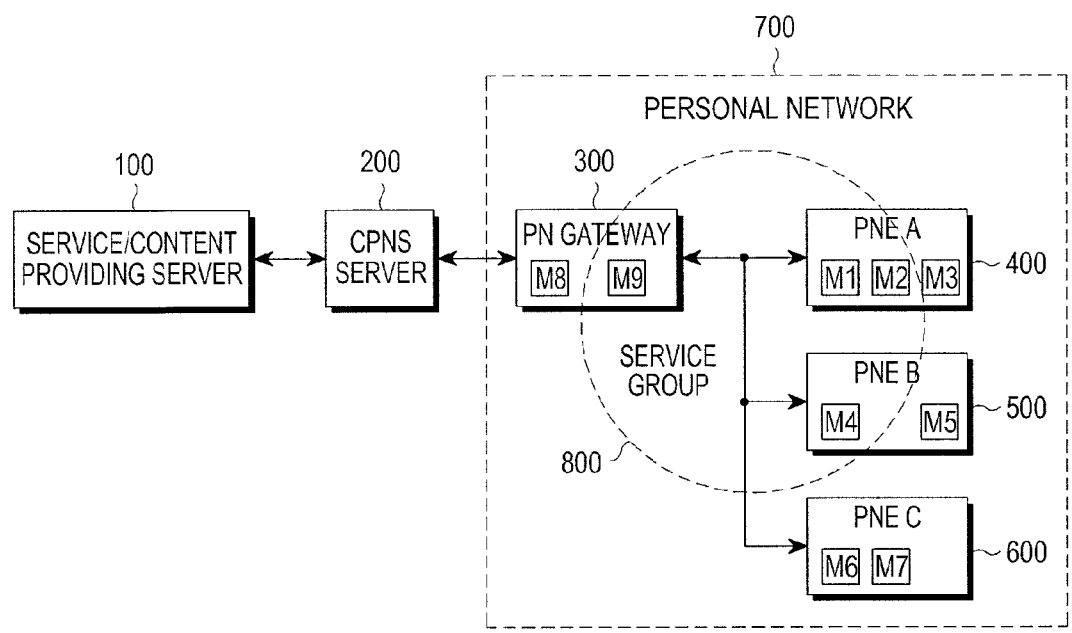
FIG. 2 illustrates a construction of a CPNS system according to an exemplary embodiment of the present invention.

FIG. 2 illustrates an example of a construction of a CPNS according to an exemplary embodiment of the present invention. The CPNS corresponds to an example of a service which can configure the personal network between apparatuses capable of performing near field communication and transfer a service provided from an external wide area communication network through the personal network.

Referring to FIG. 2, the CPNS system includes a service/content providing server 100, a CPNS server 200, a PN gateway 300, and PNEs 400, 500, and 600 (e.g., PNE A 400, PNE B 500, and PNE C 600).

The service/content providing server 100 refers to a service apparatus for providing various services and contents. For example, the service/content providing server 100 may be located in an external communication network.

The PNEs 400, 500, and 600 refer to apparatuses connected to the PN gateway 300 through near field communication to access a wide area communication network through the PN gateway 300, and can directly provide a service to the user. For example, the PNE may include a portable digital music reproducing apparatus, an audio component system, a television, a PMP, an air conditioner, a refrigerator, a smart phone, a mobile phone, a digital camera, and the like. It is apparent that all consumer electronics within home may be included in the PNE.

The PNEs 400, 500, and 600 generally include a near field communication unit therein and thus are able to perform near field communication with another apparatus, that is, another PNE or the PN gateway, but they do not include a communication module through which they can access the wide area communication network and thus cannot directly access a service provider. For example, the PNEs 400, 500, and 600 are able to perform near field communication with another adjacent apparatus or apparatus within a predefined proximity. However, an apparatus such as the smart phone capable of accessing the wide area communication network is included in the PNE and can access the personal network.

The PNEs 400, 500, and 600 configure a personal network 700 by establishing a physical pairing with the PN gateway 300 through the near field communication. Here, configuring the personal network corresponds to configuring a network for providing the CPNS in an application aspect by identifying whether the CPNS is supported between two apparatuses, identifying whether the CPNS is available through an authentication/authorization, and identifying roles of the two devices. At this time, used near filed communication includes, for example, Bluetooth communication, Zigbee communication, or Infrared Data Association (IrDA), visible light communication, Universal Plug and Play (UPnP) communication, Wireless Fidelity (WiFi) communication, and the like.

The personal network 700 configured as described above may include a plurality of PNEs 400, 500, and 600 in one PN gateway 300. The PN gateway 300 is an apparatus having a function of accessing the CPNS server 200 existing in an external network, that is, a service provider network. Further, the PN gateway 300 can configure the personal network 700 with the PNEs 400, 500, and 600, and perform a function of relaying transmission of a CPNS system message and a service or a content between the CPNS server 200 and the PNEs 400, 500, and 600. That is, when the PNEs 400, 500, and 600 included in the personal network 700 make a request for a service, the PN gateway 300 relays the request for the service and transfers the request for the service to the CPNS server 200.

Further, the PN gateway 300 performs a function of transferring the requested service to the PNEs 400, 500, and 600 when the service/content providing server 100 provides the service. Besides, the PN gateway 300 plays a role of connecting its own personal network to another personal network so that content is exchanged between the networks in a peer to peer scenario. The PN gateway 300 may be, for example, a mobile phone, a PDA, a set top box, a smart phone, and the like.

The CPNS server 200 is an apparatus for registering and managing the PN gateway 300, the PNEs 400, 500, and 600, the personal network 700, and the service group 800 and processing a request for a service and a content transferred from the PNEs 400, 500, and 600 through the PN gateway 300. If the service or the content corresponding to the request can be provided by the CPNS server 200, the CPNS server 200 provides the requested service and content to the PNEs 400, 500, and 600 through the PN gateway 300. If the service or content cannot be provided by the CPNS server 200, the request is transferred to the external service/content providing server 100 and the corresponding service and content are provided to the PNEs 400, 500, and 600 through the PN gateway 300.

In the CPNS system configured as described above, exemplary embodiments of the present invention provide a CPNS based on network apparatuses of the personal network 700, that is, the PN gateway 300 and components M1, M2, M3, M4, M5, M6, M7, M8, and M9 of respective PNEs 400, 500, and 600.

Referring to FIG. 2, it is assumed that the PNE A 400 includes a component M1, a component M2, and a component M3, the PNE B 500 includes a component M4, and a component M5, the PNE C 600 includes a component M6, and a component M7, and the PN gateway 300 includes a component M8, and a component M9. Here, the component M1, the component M2, the component M3, the component M4, the component M5, the component M6, the component M7, the component M8, and the component M9 may be a hardware component or a software component. According to exemplary embodiments of the present invention, any of the components M1-M9 may be some combination of a hardware component and a software component. Although it is illustrated in FIG. 2 that the PN gateway 300 and each of the PNEs 400, 500, and 600 include two or three components, each apparatus may include a greater number of components. Further, the components M1, M2, M3, M4, M5, M6, M7, M8, and M9 indicate components included in the PN gateway and each PNE, and they may be different from each other or the same, or similar in their functionality.

Figure 3:
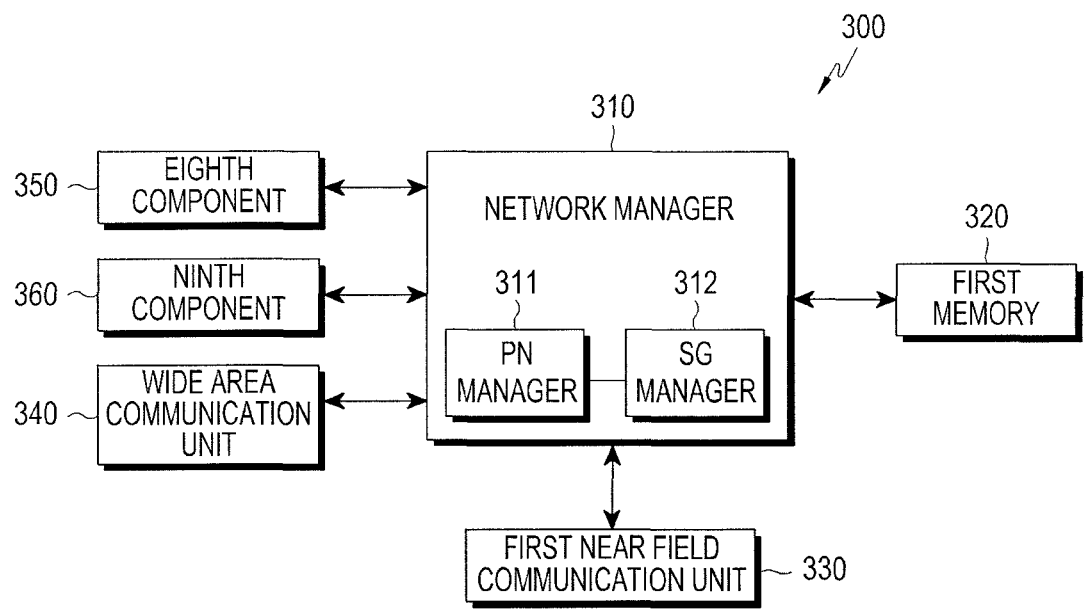
FIG. 3 illustrates a construction of a Personal Network (PN) gateway according to an exemplary embodiment of the present invention.
Figure 4:
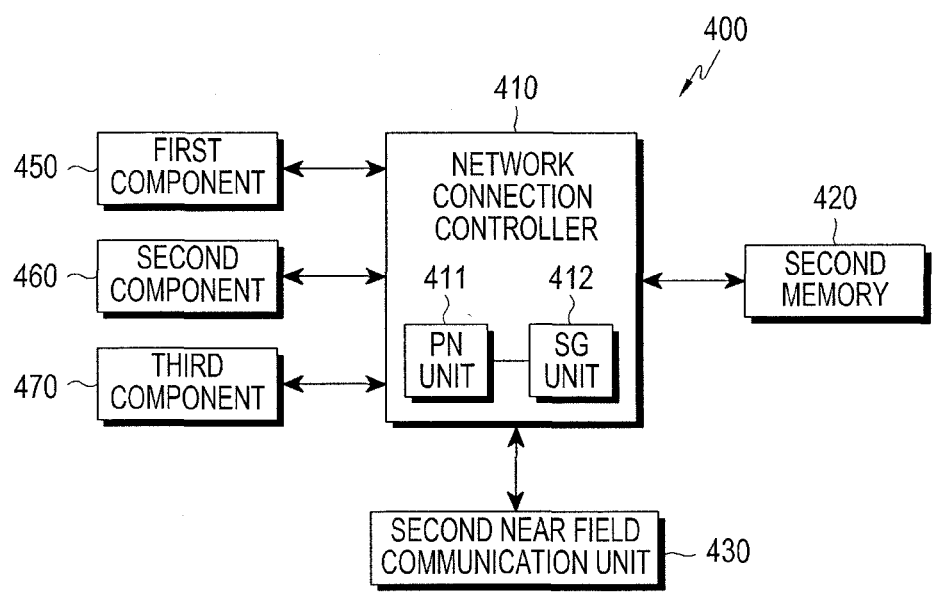
FIG. 4 illustrates a construction of a Personal Network Entity (PNE) according to an exemplary embodiment of the present invention.
Figure 5:
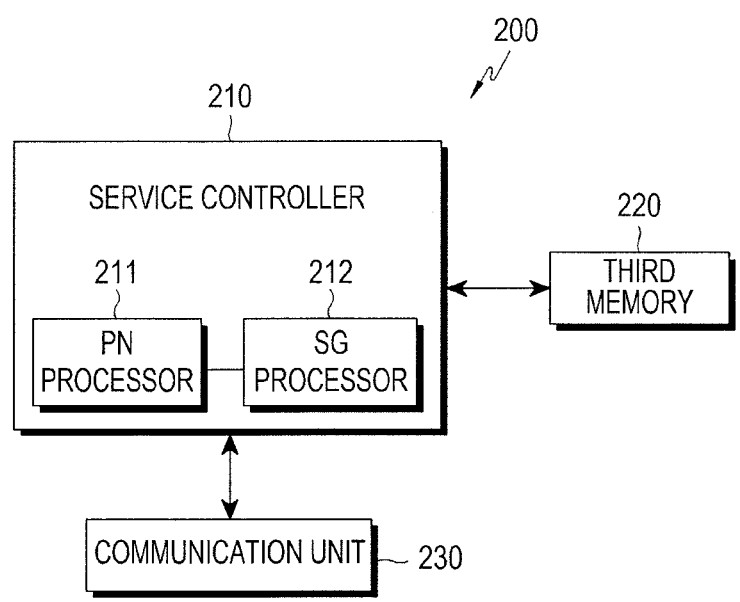
FIG. 5 illustrates a construction of a CPNS server according to an exemplary embodiment of the present invention.

Hereinafter, constructions of the CPNS server 200, the PN gateway 300, and the PNEs 400, 500, and 600 are described with reference to FIGS. 3 to 5. FIG. 3 illustrates a construction of the PN gateway 300 according to an exemplary embodiment of the present invention, FIG. 4 illustrates a construction of the PNE A according to an exemplary embodiment of the present invention, and FIG. 5 illustrates a construction of the CPNS server 200 according to an exemplary embodiment of the present invention.

Referring first to FIG. 3, the PN gateway 300 includes a network manager 310, a first memory 320, a first near field communication unit 330, a wide area communication unit 340, and one or more components 350 and 360 (e.g., an eighth component M8 350, and a ninth component M9 360).

The first near field communication unit 330 is a module for performing near field communication. For example, the first near field communication unit 330 may be a module for performing one communication of Bluetooth communication, Zigbee communication, Infrared Data Association (IrDA), visible light communication, UPnP communication, WiFi communication, and the like.

The wide area communication unit 340 is a module for performing communication with entities in an external wide area communication network under a control of the network manager 310. For example, the wide area communication unit 340 may be a module for performing one communication through a communication network provided by a service provider such as a Global Positioning System (GPS), a Wideband code Division Multiple Access (WCDMA), Global System for Mobile Communications (GSM), a World Interoperability for Microwave Access (WIMAX), and the like. The wide area communication unit 340 transmits/receives a message and data to/from the CPNS server 200 or the service/content providing server 100. The first memory 320 can be used as a working memory of a network connection controller 410 and stores various types of program data required for establishing the personal network or the service group. Further, the first memory 320 stores a PNE list for the PNEs connected to the personal network and a PN component list including component information corresponding to each PNE. The component information is information on the hardware component and the software component included in the corresponding PNE. The PN component list includes component information on the PN gateway 300 as well.

Further, the first memory 320 stores service information on a providable component based service through the PNEs 400, 500, and 600 and the PN gateway 300 of the personal network 700. The service information includes a service list and information on components which can be used in the service. Further, the service information may include information on the PNE corresponding to each of the components which can be used in the service.

Furthermore, the first memory 320 stores personal network information corresponding to the personal network 700 configured based on the PN gateway 300. The personal network information is information on the personal network 700 configured based on the PN gateway 300. The personal network information can affect a configuration of the personal network 700 and a service supply through the personal network 700 and includes information on a resource having an attribute value changeable according to a situation or a time. For example, the personal network information may include a total number of PNEs included in the personal network, information on the PNEs included in the personal network, and information on an idle PNE which does not currently receive a service or content. Further, the personal network information may also include information on PNEs included in another personal network. For example, when there are two personal networks 80 and 90 as shown in FIG. 1, the personal network information stored in the first PN gateway 10 may include information on the third PNE 70 as well as information on the first PNE 20 and the second PNE 30.

The first memory 320 stores service group information corresponding to the service group 800 included in the personal network 700. The service group information includes information PNEs included in the corresponding service group and information on a service provided to the corresponding service group. For example, in an example of the CPNS system illustrated in FIG. 2, the service group information includes information on the PNE A 400, the PNE B 500, and the PNE C 600 included in the service group 800 and information on the service provided through the service group 800. When the personal network and the service group are configured as shown in FIG. 1, the service group information includes information on the second PNE 30 and the third PNE 70, and service information provided to the service group 100.

The network manager 310 includes a PN manager 311 and an SG manager 312. The network manager 310 and controls a general operation of the PN gateway 300 related to the personal network 700. Further, the network manager 310 generates and manages the personal network 700 and the service group 800. The PN manager 311 and the SG manager 312 may be configured as one processor.

In connection with the function of generating and managing the personal network 700, the PN manager 311 generates and transmits various types of messages, processes a received message, and controls an operation of each function unit of the PN gateway 300. In connection with the function of generating and managing the service group 800, the SG manager 312 generates and transmits various types of messages, processes a received message, and controls an operation of each function unit of the PN gateway 300.

The network manager 310 controls the first near field communication unit 330 in order to configure the personal network 700 and performs the physical pairing with neighboring apparatuses to establish a communication link. Further, when the network manager 310 receives a mode search message from the physically paired apparatuses, the network manager 310 transfers a response message indicating the PN gateway to a corresponding apparatus.

When the network manager 310 receives a personal network generation request message from the paired apparatus, the PN manager 311 of the network manager 310 performs an authentication and an authorization for the corresponding apparatus, assigns a PNE identifier, and generates a PN component list or renews a conventionally existing PN component list. That is, the PN manager 311 inserts component information received together with the personal network generation request message in the PN component list in accordance with a corresponding PNE and stores the PN component list including the component information in the first memory 320.

In order to involve the physically paired apparatus in the personal network 700, the PN manager 311 generates a personal network participation request message and transmits the generated personal network participation request message to the corresponding apparatus, performs an authentication and an authorization for the corresponding apparatus when a personal network participation response message is received from the corresponding apparatus, assigns a PNE identifier, and configures a new PN component list or renews a conventionally existing PN component list. For example, the PN manager 311 inserts component information received together with the personal network participation response message in the PN component list in accordance with a corresponding PNE and stores the PN component list including the component information in the first memory 320. Further, when a PNE excluded from the personal network 700 is generated, the PN manager 311 renews the PN component list.

The PN manager 311 registers the PN component list in the CPNS server 200. After registering the PN component list, the PN manager 311 can renew the PN component list registered in the CPNS server 200 whenever a PNE participating in the personal network 700 is renewed.

After registering the PN component list in the CPNS server 200, the PN manager 311 transfers service information on a component based service received from the CPNS server 200 to each PNE through the first near field communication unit 330.

When the SG manager 312 receives a service providing request and a service group establishment request message from the PNE, the SG manager 312 generates a service group participation request message and transmits the generated service group participation request message to the corresponding PNE through the first near field communication unit 300 in order to establish a service group including PNEs including components related to the requested particular service. Further, after obtaining an agreement through a service group participation response message received from the corresponding PNE, the SG manager 312 makes a request to provide the particular service and establish the service group from the CPNS server 200. Then, the SG manager 312 controls the PN gateway 300 so that the particular service provided in the unit of service groups can be transmitted to the corresponding PNE.

The eighth component M8 350 and the ninth component M9 360 indicate various types of components included in the PN gateway 300, and may be the hardware components or the software components. Although FIG. 3 illustrates that the PN gateway 300 includes two components 350 and 360, the PN gateway 300 can include a greater number of components according to a type of electronic apparatus to which the actual PN gateway 300 belongs. For example, if the PN gateway 300 is a smart phone, the eighth component 350 and the ninth component 360 may be one of a touch panel module, a display module, a GPS module, a microphone module, a mobile communication module, a speaker module, a camera module, various sensors, a user input module, a dynamic codec application, an audio codec application, a game application, a web browser application, and the like.

Next, a construction of the PNE A 400 according to an exemplary embodiment of the present invention is described with reference to FIG. 4. Although exemplary embodiments of the present invention describe only the construction of the PNE A 400, the PNE B 500 and the PNE C 600 can be similarly constructed to the PNE A 400.

Referring to FIG. 4, the PNE A 400 includes the network connection controller 410, a second memory 420, a second near field communication unit 430, and one or more components 450, 460, and 470 (e.g., a first component M1 450, a second component M2 460, and a third component M3 470).

The second near field communication 430 is a module for performing near field communication. For example, the second near field communication 430 may perform one communication of Bluetooth communication, Zigbee communication, or Infrared Data Association (IrDA), visible light communication, Universal Plug and Play (UPnP) communication, Wireless Fidelity (WiFi) communication, and the like. However, the second near field communication unit 430 performs the same type of near field communication as that of the first near field communication unit 330.

The second memory 420 can be used as a working memory of the network connection controller 410 and store various types of program data required for configuring the personal network and establishing the service group, and component information of the PNE A 400.

Further, the second memory 420 stores the PNE identifier assigned by the PN gateway 300 when the personal network is established. Also, the second memory 420 stores data received from the PN gateway 300 in response to the request for the service and the content. Moreover, the second memory 420 stores the PN component list received from the PN gateway 300 after the personal network has been generated, and stores information on a particular service group when the PNE A 400 is a member PNE of the particular service group.

The network connection controller 410 includes a PN unit 411 and an SG unit 412. The network connection controller 410 controls all operations of the PNE A 400 related to the configuration and the release of the personal network and all operations of the PNE A 400 related to the establishment and the release of the service group, and controls an operation related to the request and the reception of the service or the content through the configured personal network or service group.

Accordingly, in order to configure the personal network, the network connection controller 410 controls the second near field communication unit 430 and performs the physical pairing with neighboring apparatuses to configure the communication link. Further, the PN unit 411 of the network connection controller 410 performs a search to find the PN gateway 300 among the physically paired apparatuses. When the PN gateway 300 is found, the PN unit 411 makes a request for a personal network connection by generating and transmitting a personal network connection request message. At this time, the component information of the PNE A 400 also can be transmitted. The component information of the PNE A 400 includes information on a first component 450, a second component 460, and a third component 470.

Alternatively, when the PN unit 411 receives the personal network participation request message from the PN gateway 300 through the second near field communication unit 430, the PN unit 411 can transmit the personal network participation response message for allowing a connection to the personal network according to a user's selection or automatically to the PN gateway 300. At this time, the personal network participation response message includes the component information of the PNE A 400.

Thereafter, when the PN unit 411 receives the PNE identifier together with a notice informing that the PN gateway 300 is connected to the personal network through the personal network generation response message transmitted from the PN gateway 300, the PN unit 411 stores the notice and the PNE identifier in the second memory 420. Further, the PN unit 411 makes a request for and receives the service or the content, for example, a music file or a dynamic image file from the CPNS server 200 through the connected PN gateway 300 according to a request of the user, and can store the received service and content in the second memory 420.

Further, the PN unit 411 stores service information on the component based service transmitted from the PN gateway 300 in the second memory 420 and can provide the service information to the user.

When there is an input by the user for selecting a particular service, the SG unit 412 generates the service providing request and the service group establishment request message and transmits the generated service providing request and the service group establishment request message to the PN gateway 300 through the second near field communication unit 430 in order to establish the service group including PNEs including components related to the selected service.

Alternatively, the SG unit 412 can receive the service group participation request message from the PN gateway 300 through the second near field communication unit 430, generate the service group participation response message including information on whether the PN gateway 300 is included in the service group according to a user's selection or automatically, and transmit the generated service group participation response message to the PN gateway 300. The service group participation request message includes a service identifier to be provided through the service group and component information required for a service execution. Accordingly, the SG unit 412 identifies whether the required component is currently used for performing a particular function, and can determine whether to involve the PN gateway 300 in the service group based on a result of the identification.

Next, the SG unit 412 can receive a notice informing that the PN gateway 300 has been included in the particular service group through a service group establishment response message transmitted from the PN gateway 300.

Further, when the SG unit 412 receives the service or the content from the PN gateway 300, the SG unit 412 checks a current operation state of the PNE A 400, and controls the PNE A 400 such that the received service or content is output according to the operation state. In other words, the SG unit 412 may be in an operation state in order to enable the PNE A 400 to perform the particular function when the SG unit 412 receives the service or the content from the PN gateway 300.

For example, if the PNE A 400 is a television, a broadcasting program may be being output when the PNE A 400 receives the content. If the PNE A 400 is a stereo music reproducing apparatus, music may be being reproduced when the PNE A 400 receives the content.

In this case, the SG unit 412 stops a corresponding operation or controls such that the PNE A 400 can output the received service or content together with performing the particular function at the same time.

When the SG unit 412 receives a particular content from the PN gateway 300, the SG unit 412 identifies whether the PN gateway 300 is the PN gateway having transmitted the service group participation request message. When the PN gateway 300 is the PN gateway having transmitted the service group participation request message as a result of the identification, the SG unit 412 identifies the component of the PNE A 410 required for outputting the particular content and whether the corresponding component is used. When the corresponding component is not currently used, the SG unit 412 controls the PNE A 400 such that the particular content is output through the corresponding component.

When the corresponding component is currently used, the SG unit 412 can output a guide message, stop an operation of the corresponding component according to a selection input of the user, and control such that the particular content is output through the corresponding component. Alternatively, based on a set value, the SG unit 412 can stop the operation of the corresponding component and control such that the particular content is output through the corresponding component, or reject the output of the particular content. At this time, the set value may be a user preference or a priority of the currently executed function and the particular content.

For example, in a state where the PNE A 400 is the television and the PNE A 400 receives a current broadcasting program to output the program through the display module, the PNE A 400 can receive a particular dynamic image content and be requested to reproduce the content. In this case, when the user selects to reproduce the particular dynamic image content, the SG unit 412 stops outputting the broadcasting program and can control such that the display module outputs the particular dynamic image content.

Alternatively, if it is possible to output the particular dynamic image content even though the corresponding component is being operated, the SG unit 412 can control such that the particular dynamic image content is output without stopping the operation of the corresponding component. In the above example, the SG unit 412 can control such that the display module outputs the broadcasting program and the particular dynamic image content in a PIP (Picture In Picture) manner at the same time.

If a plurality of components are required to output the particular content and some of the components are being used, the SG unit 412 can control such that the particular content is output using only components which are not being used.

The first component M1 450, the second component M2 460, and the third component M3 470 indicate various types of components included in the PNE A 400, and may be hardware components or software components. Although FIG. 4 illustrates that the PNE A 400 includes only the three components 450, 460, and 470, the PNE A 400 may include a greater number of components according to a type of electronic apparatus including the PNE A 400.

For example, when the PNE A 400 is the television, the first component 450, the second component 460, and the third component 470 may be one of the broadcasting receiving module, the display module, the speaker module, the user input module, and the dynamic image reproducing application.

Next, a construction of the CPNS server 200 is described with reference to FIG. 5. Referring to FIG. 5, the CPNS server 200 includes a service controller 210, a third memory 220, and a communication unit 230.

The communication unit 230 performs communication with the PN gateway 300 and the service/content providing server 100 according to a control of the service controller 210.

The third memory 220 stores subscription information and authentication information on various types of electronic apparatuses subscribing to the CPNS. Further, the third memory 220 registers and stores a PN component list transferred from the PN gateway 300. Furthermore, the third memory 220 stores information on the PN gateway and the PNE corresponding to each personal network and information on a service group related to the personal network. Moreover, the third memory 220 stores various contents, services and the like to be provided to the PNE, and service information on a providable component based service based on each personal network.

The service controller 210 controls a general operation of the CPNS server 200 and includes a PN processor 211 and an SG processor 212 to register and manage a plurality of personal networks and service groups related to the personal networks.

The PN processor 211 of the service controller 210 performs an authentication and an authorization for the use of the CPNS by the PNE included in the PN component list according to a personal network registration request or a PN component list registration request, and stores the PN component list in the third memory 220. Further, the PN processor 211 configures the service information on the providable component based service by using each PNE included in the PN component list and component information of the PN gateway, or obtains the service information from the service/content providing server 100. Then, the PN processor 211 transmits the service information to the PN gateway 300.

The SG processor 212 authenticates the PNE included in a corresponding service group according to a service group establishment request of the PN gateway 300, registers the service group, and transmits a service group establishment response message to the PN gateway 300.

Further, the service controller 210 transfers a particular service or content requested by the PN gateway 300 to the PN gateway 300.

According to an exemplary embodiment of the present invention, a process of providing the component based service in the CPNS system configured as described above is described with reference to FIGS. 6A to 7B. FIGS. 6A to 7B illustrate a process of establishing the service group and providing the service according to an exemplary embodiment of the present invention.

First, Table 1 and Table 2 show basic configurations of request messages and response messages used in each process of the exemplary embodiments of the present invention. Various types of request messages and response messages used in each process are constructed using only required fields from messages shown in Table 1 and Table 2.

TABLE 1

| Name | Cardinality | T | Data Type | Description |
|---|---|---|---|---|
| Personal network generation request message (PNSetupRequestmessage) | 1 | | E | Refers to a PN generation request message sent to the PN GW by the PNE. Its sub attribute is OriginEntityID. Its sub element is InvitedPNEID. |

TABLE 1-continued

| Name | Cardinality | T | Data Type | Description |
|---|---|---|---|---|
| Request entity identifier (OriginEntityID) | 1 | A | String | Refers to an identifier of the CPNS entity requesting an actual PN generation and includes a PN GW identifier or a PNE identifier. |
| Invited PNE identifier (InvitedPNEID) | 0 . . . n | E | String | Refers to an identifier of the PNE to participate in a PN generation. |
| Personal network information (PNInfo) | 1 | E | | Refers to information on the PN and the configuration entity which should be registered in the CPNS. Its sub attributes are PNID. Its sub elements are PNGWInfo and PNEInfo. |
| PNGW information (PNGWInfo) | 0 . . . N | E | | Refers to PNGW information. Its sub attributes are PNGWID and PNGWDeviceComponent. |
| PNGW identifier (PNGWID) | 1 . . . N | A | String | Refers to a PNGW identifier. |
| Device component (DeviceComponent) | 1 . . . N | E | | Refers to a hardware component or a software component which can provide a service within the device (e.g., a GPS, a microphone, a communication module/component of a mobile phone). |
| PNE information (PNEInfo) | 0 . . . N | E | | Refers to PNE information. Its sub attributes are PNEID and DeviceComponent. |
| Device identifier (PNEID) | 1 . . . N | A | String | Refers to an identifier for distinguishing devices. |
| Device component (DeviceComponent) | 1 . . . N | E | | Refers to a hardware component or a software component which can provide a service within the device (e.g., a GPS, a microphone, a communication module/component of a mobile phone). |

TABLE 2

| Name | Cardinality | T | Data Type | Description |
|---|---|---|---|---|
| Personal network generation response message (PNSetupResponsetmessage) | 1 | E | | Refers to a PN generation response message in response to the PN generation request. Its sub attribute is Return |
| Response (Return) | 1 | A | Integer | Refers to a response to the PN generation request. 1. OK 2. Failure: CPNS Enabler cannot process a requested matter (e.g., internal error process occurs in the device embedding PNE). 3. Not accepted: the user of the CPNS rejects the request. |

TABLE 2-continued

| Name | Cardinality | T | Data Type | Description |
| --- | --- | --- | --- | --- |
| Personal network information (PNInfo) | 1 | E | | Refers to information on the PN and the configuration entity which should be registered in the CPNS. Its sub attributes are PNID Its sub elements are PNGWInfo PNEInfo |
| PNGW information (PNGWInfo) | 0 . . . N | E | | PNGW information Its sub attributes are PNGWID PNGWDeviceComponent |
| PNGW identifier (PNGWID) | 1 . . . N | A | String | Refers to a PNGW identifier. |
| Device component (DeviceComponent) | 1 . . . N | E | | Refers to a hardware component or a software component which can provide a service within the device (e.g., a GPS, a microphone, a communication module/component of a mobile phone). |
| PNE information (PNEInfo) | 1 . . . N | E | | Refers to PNE information. Its sub attributes are PNEID DeviceComponent |
| Device identifier (PNEID) | 1 | A | String | Refers to an identifier for distinguishing devices |
| Device component (DeviceComponent) | 1 . . . N | E | | Refers to a hardware component or a software component which can provide a service within the device (e.g., a GPS, a microphone, a communication module/component of a mobile phone). |

Figure 6A:
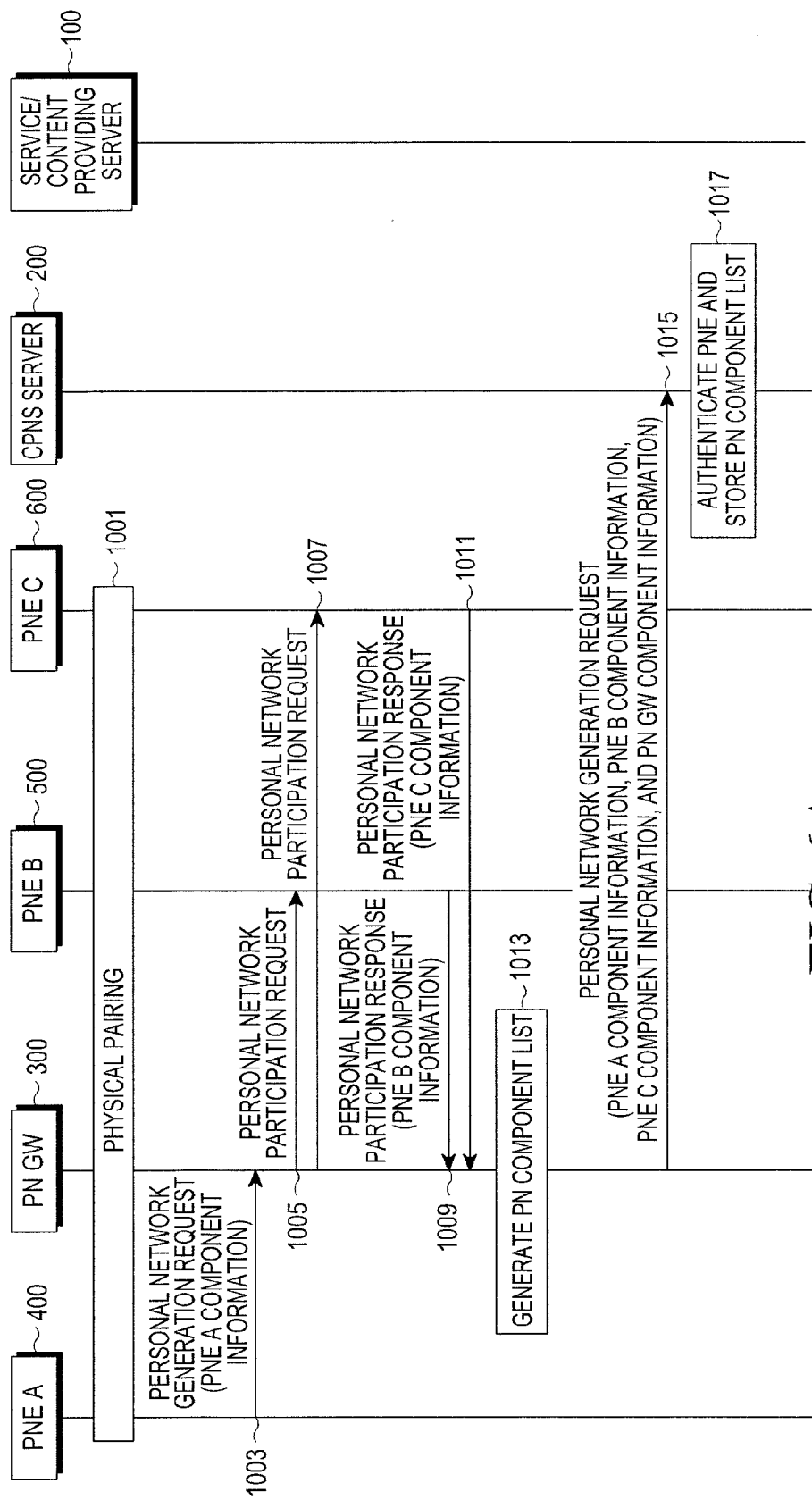
FIGS. 6A and 6B illustrate a process of establishing a service group and providing a service according to an exemplary embodiment of the present invention.
Figure 6B:
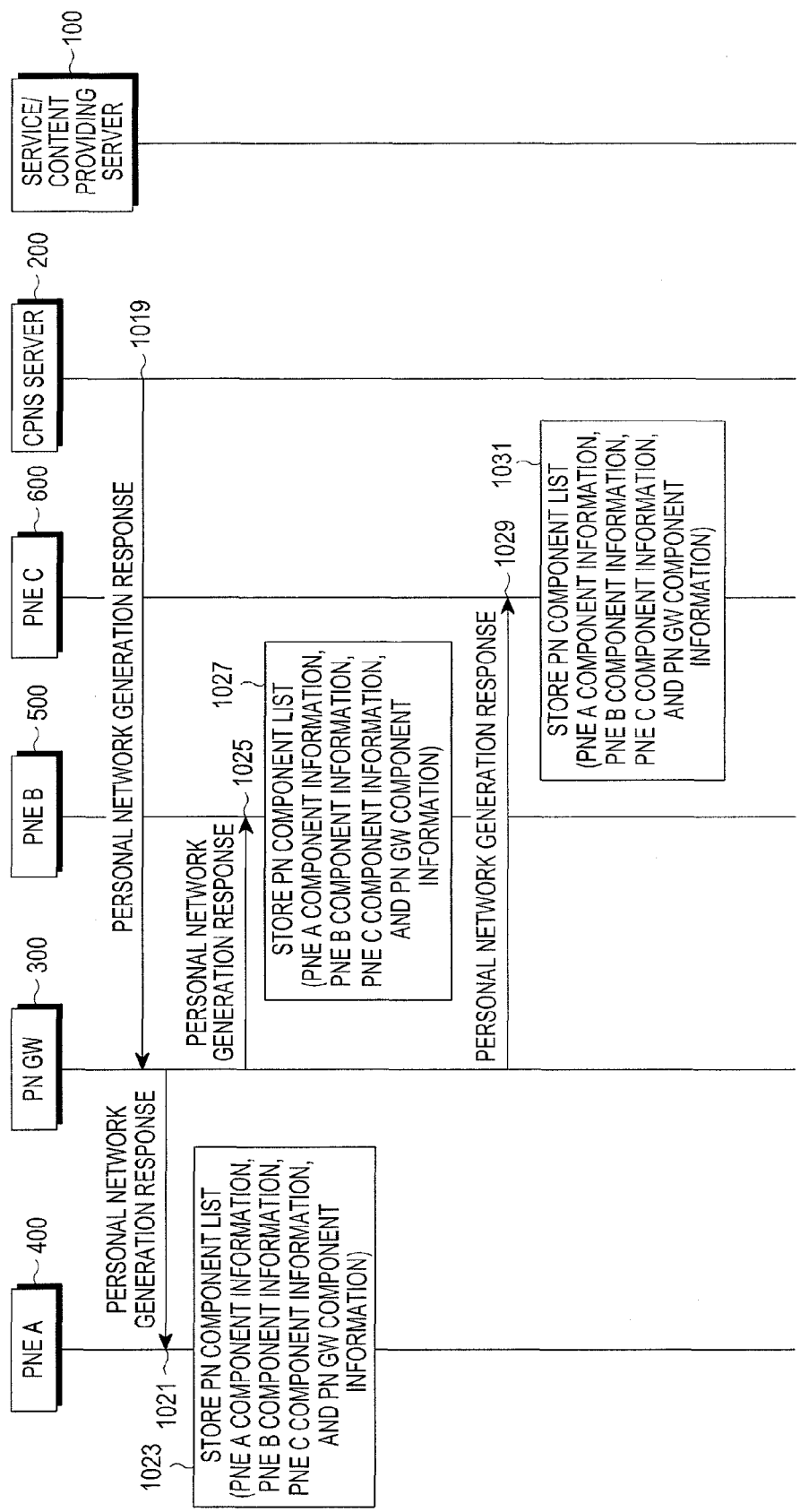

Referring to FIGS. 6A and 6B, the PN gateway 300 performs an operation for data communication, that is, a physical pairing with the PNE A 400, the PNE B 500, and the PNE C 600 by using a near field communication scheme in step 1001. At this time, the used near field communication may include, for example, one of Bluetooth communication, Zigbee communication, IrDA (Infrared Data Association), visible light communication, UPnP communication, WiFi communication, and the like.

In step 1003, the PNE A 400 transmits a personal network generation request message (PNSetupRequestMessage) to the PN gateway 300. Table 3 shows an example of the personal network generation request message.

TABLE 3

| Name | Cardinality | T | Data Type | Description |
| --- | --- | --- | --- | --- |
| Personal network generation request message (PNSetupRequestmessage) | 1 | E | | Refers to a PN generation request message sent to the PN GW by the PNE. Its sub attribute is OriginEntityID Its sub element is InvitedPNEID |
| Request entity identifier (OriginEntityID) | 1 | A | String | Refers to an identifier of the CPNS entity requesting an actual PN generation and includes a PN GW identifier or a PNE identifier (PNE A in this exemplary embodiment). |

TABLE 3-continued

| Name | Cardinality | T | Data Type | Description |
|---|---|---|---|---|
| Invited PNE identifier (InvitedPNEID) | 0 . . . n | E | String | Refers to an identifier of the PNE to participate in a PN generation (PNE B and PNE C in this exemplary embodiment). |
| Personal network information (PNInfo) | 1 | E | | Refers to information on the PN and the configuration entity which should be registered in the CPNS. Its sub attributes are PNID Its sub elements are PNGWInfo PNEInfo |
| PNID | 0 . . . 1 | A | String | Refers to a PN identifier. |
| PNGW information (PNGWInfo) | 0 . . . N | E | | Refers to PNGW information Its sub attributes are PNGWID |
| PNGW identifier (PNGWID) | 1 . . . N | A | String | Refers to a PNGW identifier. (PNGW 300 in this exemplary embodiment) |
| PNE information (PNEInfo) | 0 . . . N | E | | Refers to PNE information. Its sub attributes are PNEID componentInfo. |
| Device identifier (PNEID) | 1 . . . N | A | String | Refers to an identifier for distinguishing devices (PNE A in this exemplary embodiment). |
| Component information (componentInfo) | 1 . . . N | E | | Refers to a hardware component or a software component which can provide a service within the device (e.g. a GPS, a microphone, a communication module/component of a mobile phone). |

The personal network generation request message includes component information of the PNE A 400 (e.g., information on a camera, a GPS, and an application) and a connection type identifier of the personal network. In other words, the PNE A 400 can set one of a scheme in which the PNE A 400 configures the personal network alone and a scheme in which the PNE A 400 configures the personal network with all of neighboring PNEs by using the connection type identifier. At this time, the component information included in the personal network generation request message transmitted to the PN gateway 300 can be provided in a form of "component type_component name_component identifier". For example, component information on the GPS module which is the hardware component can be expressed as "HW_GPS_GPS-FGM300", and component information on the video codec application which is the software component can be expressed as "SW_VideoCodec_AVI". Alternatively, component information can be provided in a form as shown in Table 4 but not limited thereto.

TABLE 4

| Component Info | Cardinality | T | Description |
|---|---|---|---|
| ComponentInfo (component information) | 0 . . . n | E | Refers to information on components within the device. Its sub attribute is |

TABLE 4-continued

| Component Info | Cardinality | T | Description |
|---|---|---|---|
| | | | componentType componentName componentID |
| ComponentType (component type) | 1 | A | Refers to types of components. 1. hardware component 2. software component |
| ComponentName (component name) | | A | Refers to names of components (e.g., camera, GPS, codec, etc). |
| ComponentID (component identifier) | 1 | A | Refers to a serial number of the GPS module or an identifier of the video codec application component (e.g., GPS: GPSFGM300, video codec application: MPEG2). |

The PN gateway 300 having received the personal network generation request message identifies the connection type identifier of the personal network and the apparatus participating in the personal network included in the personal network generation request message, and transmits a personal network participation request message to the corresponding PNE, that is, the PNE B 500 and the PNE C 600 in steps 1005 and 1007. The personal network generation request message in step 1003 and the personal network participation request message in steps 1005 and 1007 generally have the same message format. However, the personal network generation request message in step 1003 is a message, which includes the component information, sent to the PN gateway 300 by the PNE A 400, and the personal network participation request message in steps 1005 and 1007 is a message used for making a request for a connection to the personal network from the PNE B 500 and the PNE C 600 by the PN gateway 300. The messages may be constructed as shown in Table 5. At this time, the personal network participation request message may include the component information of the PNE A 400 or may not include the component information of the PNE A 400 according to another exemplary embodiment of the present invention.

TABLE 5

| Name | Cardinality | T | Data Type | Description |
|---|---|---|---|---|
| Personal network generation request message (PNSetupRequestmessage) | 1 | E | | Refers to a PN generation request message sent to the PN GW by the PNE. Its sub attribute is OriginEntityID. Its sub element is InvitedPNEID. |
| Request entity identifier (OriginEntityID) | 1 | A | String | Refers to an identifier of the CPNS entity requesting an actual PN generation and includes a PN GW identifier or a PNE identifier (PNE A and PNE B in this exemplary embodiment). |
| Invited PNE identifier (InvitedPNEID) | 0 . . . n | E | String | Refers to an identifier of the PNE to participate in a PN generation (PNE B and PNE C in this exemplary embodiment). |
| Personal network information (PNInfo) | 1 | E | | Refers to information on the PN and the configuration entity which should be registered in the CPNS. Its sub attributes are PNID. Its sub elements are PNGWInfo PNEInfo |
| PNID | 0 . . . 1 | A | String | Refers to a PN identifier |
| PNGW information (PNGWInfo) | 0 . . . N | E | | Refers to PNGW information. Its sub attributes are PNGWID componentInfo |
| PNGW identifier (PNGWID) | 1 . . . N | A | String | Refers to a PNGW identifier (PNGW 300 in this embodiment). |
| Component information (ComponentInfo) | 1 . . . N | E | | Refers to a hardware component or a software component which can provide a service within the PNGW (e.g., a GPS, a microphone, a communication module/component of a mobile phone). |
| PNE information (PNEInfo) | 0 . . . N | E | | Refers to PNE information. Its sub attributes are PNEID componentInfo |
| Device identifier (PNEID) | 1 . . . N | A | String | Refers to an identifier for distinguishing devices. |
| Component information (ComponentInfo) | 1 . . . N | E | | Refers to a hardware component or a software component which can provide a service within the PNE A (e.g., a GPS, a microphone, a communication module/component of a mobile phone). |

Meanwhile, when the PNE B 500 having received the personal network participation request message desires to participate in the configuration of the personal network, the PNE B 500 generates a personal network participation response message indicating a participation acceptance, inserts component information (e.g. information on a microphone and an application) of the PNE B 500 in the generated personal network participation response message, and transmits the personal network participation response message as shown in Table 6 to the PN gateway 300 in step 1009. When the PNE B 500 does not desire to participate in the configuration of the personal network, the PNE B 500 transmits a personal network participation response message indicating a participation rejection to the PN gateway 300. The PNE C 600 also similarly operates in step 1011.

TABLE 6

| Name | Cardinality | T | Data Type | Description |
|---|---|---|---|---|
| Personal network generation response message (PNSetupResponsetmessage) | 1 | E | | Refers to a PN generation response message in response to the PN generation request. Its sub attribute is Return |
| Response (Return) | 1 | A | Integer | Refers to a response to the PN generation request. 1. OK 2. Failure: CPNS Enabler cannot process a requested matter (e.g., internal error process occurs in the device embedding PNE). 3. Not accepted: the user of the CPNS rejects the request. |
| Personal network information (PNInfo) | 1 | E | | Refers to information on the PN and the configuration entity which should be registered in the CPNS. Its sub attributes are PNID Its sub elements are PNGWInfo PNEInfo |
| PNID | 0 . . . 1 | A | String | Refers to a PN identifier. |
| PNGW information (PNGWInfo) | 0 . . . N | E | | PNGW information Its sub attributes are PNGWID componentInfo |
| PNGW identifier (PNGWID) | 1 . . . N | A | String | Refers to a PNGW identifier (PNGW 300 in this exemplary embodiment). |
| Component information (CompnentInfo) | 1 . . . N | E | | Refers to a hardware component or a software component which can provide a service within the PNGW (e.g., a GPS, a microphone, a communication module/component of a mobile phone). |
| PNE information (PNEInfo) | 1 . . . N | E | | Refers to PNE information (PNE B or PNE C in this exemplary embodiment). Its sub attributes are PNEID componentInfo |
| Device identifier (PNEID) | 1 | A | String | Refers to an identifier for distinguishing devices (PNE B or PNE C in this exemplary embodiment). |
| Component information (ComponentInfo) | 1 . . . N | E | | Refers to a hardware component or a software component which can provide a service within the PNE B or the PNE C (e.g., a GPS, a microphone, a communication module/component of a mobile phone). |

The PN gateway 300 having received the personal network participation response message generates a PN inventory by using the personal network generation request message received from the PNE A 400 and the personal network participation response message received from each of the PNE B 500 and the PNE C 600 in step 1013. The PN inventory includes one or more of a device list of PNEs and information on the personal network including the PNEs, that is, PN identification information. The PN inventory may include device information on each PNE. Further, the PN inventory includes hardware component information of each of the PNEs 400, 500, and 600 and the PN gateway 300, and a PN component list including software component information.

After generating the PN inventory, the PN gateway 300 generates a personal network generation request message including the PN component list as shown in Table 7 and transmits the generated personal network generation request message to the CPNS server 200 in step 1015.

TABLE 7

| Name | Cardinality | T | Data Type | Description |
| --- | --- | --- | --- | --- |
| Personal network generation request message (PNSetupRequestmessage) | 1 | E | | Refers to a PN generation request message sent to the PN GW by the PNE. Its sub attribute is OriginEntityID. Its sub element is InvitedPNEID. |
| Request entity identifier (OriginEntityID) | 1 | A | String | Refers to an identifier of the CPNS entity requesting an actual PN generation and includes a PN GW identifier or a PNE identifier (PNE A in this exemplary embodiment). |
| Invited PNE identifier (InvitedPNEID) | 0 . . . n | E | String | Refers to an identifier of the PNE to participate in a PN generation (PNE B or PNE C in this exemplary embodiment). |
| Personal network information (PNInfo) | 1 | E | | Refers to information on the PN and the configuration entity which should be registered in the CPNS. Its sub attributes are PNID. Its sub elements are PNGWInfo and PNEInfo. |
| PNID | 0 . . . 1 | A | String | Refers to a PN identifier. |
| PNGW information (PNGWInfo) | 0 . . . N | E | | Refers to PNGW information. Its sub attributes are PNGWID and componentInfo. |
| PNGW identifier (PNGWID) | 1 . . . N | A | String | Refers to a PNGW identifier (PNGW 300 in this exemplary embodiment). |
| Component information (ComponentInfo) | 1 . . . N | E | | Refers to a hardware component or a software component which can provide a service within the PNGW (e.g., a GPS, a microphone, a communication module/component of a mobile phone). |
| PNE information (PNEInfo) | 0 . . . N | E | | Refers to PNE information (PNE A in this exemplary embodiment). Its sub attributes are PNEID componentInfo |
| Device identifier (PNEID) | 1 . . . N | A | String | Refers to an identifier for distinguishing devices. |

TABLE 7-continued

| Name | Cardinality | T | Data Type | Description |
|---|---|---|---|---|
| Component information (ComponentInfo) | 1 ... N | E | | Refers to a hardware component or a software component which can provide a service within the PNE A (e.g., a GPS, a microphone, a communication module/component of a mobile phone). |
| PNE information (PNEInfo) | 1 ... N | E | | Refers to PNE information (PNE B in this exemplary embodiment). Its sub attributes are PNEID DeviceComponent |
| Device identifier (PNEID) | 1 | A | String | Refers to an identifier for distinguishing devices (PNE B in this exemplary embodiment). |
| Component information (ComponentInfo) | 1 ... N | E | | Refers to a hardware component or a software component which can provide a service within the PNE B (e.g., a GPS, a microphone, a communication module/component of a mobile phone). |
| PNE information (PNEInfo) | 1 ... N | E | | Refers to PNE information (PNE B in this exemplary embodiment). Its sub attributes are PNEID DeviceComponent |
| Device identifier (PNEID) | 1 | E | String | Refers to an identifier for distinguishing devices (PNE C in this exemplary embodiment). |
| Component information (ComponentInfo) | 1 ... N | E | | Refers to a hardware component or a software component which can provide a service within the PNE C (e.g., a GPS, a microphone, a communication module/component of a mobile phone). |

The CPNS server 200 performs an authentication for the PN gateway 300 and each of the PNEs 400, 500, and 600 included in the personal network generation request message in step 1015. At this time, the authentication for the PN gateway 300 and each of the PNEs 400, 500, and 600 refers to a procedure of identifying whether the PN gateway 300 and each of the PNEs 400, 500, and 600 have qualification to receive the CPNS and authorizing the service provision. The authentication procedure for the PNEs 400, 500, and 600 and the PN gateway 300 can be performed in advance before the personal network generation request message is received in step 1015.

After receiving the personal network generation request message in step 1015, the CPNS server 200 identifies whether the PN gateway 300 and the PNEs 400, 500, and 600 are authorized in step 1017.

When the PN gateway 300 and the PNEs 400, 500, and 600 are not authorized, the CPNS server 200 performs the authorization for the PN gateway 300 and the PNEs 400, 500, and 600. When the PN gateway 300 and the PNEs 400, 500, and 600 are successfully authorized, the CPNS server 200 stores information on the corresponding PNEs 400, 500, and 600 and the PN gateway 300, information on the personal network, and the PN component list, and terminates the authentication procedure.

When the authentication procedure for the PNEs 400, 500, and 600 and the PN gateway 300 has been performed before, the CPNS server 200 does not perform an additional authentication operation.

When the PN gateway 300 and the PNEs 400, 500, and 600 are successfully authorized, the CPNS server 200 stores the PN component list received from the PN gateway 300, generates a personal network generation response message informing that the personal network has been registered as shown in Table 8, and transmits the generated personal network generation response message to the PN gateway 300 in step 1019. At this time, the personal network generation response message includes the PN component list.

TABLE 8

| Name | Cardinality | T | Data Type | Description |
|---|---|---|---|---|
| Personal network generation response message (PNSetupResponsetmessage) | 1 | E | | Refers to a PN generation response message in response to the PN generation request. Its sub attribute is Return |
| Response (Return) | 1 | A | Integer | Refers to a response to the PN generation request. 1. OK 2. Failure: CPNS Enabler cannot process a requested matter (e.g., internal error process occurs in the device embedding PNE). 3. Not accepted: the user of the CPNS rejects the request. |
| Personal network information (PNInfo) | 1 | E | | Refers to information on the PN and the configuration entity which should be registered in the CPNS. Its sub attributes are PNID Its sub elements are PNGWInfo PNEInfo |
| PNID | 0 . . . 1 | A | String | Refers to a PN identifier. |
| PNGW information (PNGWInfo) | 0 . . . N | E | | PNGW information Its sub attributes are PNGWID componentInfo |
| PNGW identifier (PNGWID) | 1 . . . N | A | String | Refers to a PNGW identifier. |
| Module information (componentInfo) | 1 . . . N | E | | Refers to a hardware component or a software component which can provide a service within the PNGW (e.g., a GPS, a microphone, a communication module/component of a mobile phone). |
| PNE information (PNEInfo) | 0 . . . N | E | | Refers to PNE information (PNE A in this exemplary embodiment). Its sub attributes are PNEID componentInfo |
| Device identifier (PNEID) | 1 . . . N | A | String | Refers to an identifier for distinguishing devices |
| Module information (componentInfo) | 1 . . . N | E | | Refers to a hardware component or a software component which can provide a service within the PNE A (e.g., a GPS, a microphone, a communication module/component of a mobile phone). |
| PNE information (PNEInfo) | 1 . . . N | E | | Refers to PNE information (PNE B in this exemplary embodiment). Its sub attributes are PNEID componentInfo |
| Device identifier (PNEID) | 1 | A | String | Refers to an identifier for distinguishing devices (PNE B in this exemplary embodiment). |

TABLE 8-continued

| Name | Cardinality | T | Data Type | Description |
|---|---|---|---|---|
| Module information (componentInfo) | 1 ... N | E | | Refers to a hardware component or a software component which can provide a service within the PNE B (e.g., a GPS, a microphone, a communication module/component of a mobile phone). |
| PNE information (PNEInfo) | 1 ... N | E | | Refers to PNE information (PNE C in this embodiment). Its sub attributes are PNEID DeviceComponent |
| Device identifier (PNEID) | 1 | E | String | Refers to an identifier for distinguishing devices (PNE C in this exemplary embodiment). |

When the PN gateway 300 receives the personal network generation response message from the CPNS server 200 in step 1019, the PN gateway 300 generates a response message informing that the personal network has been successfully generated and registered and transmits the generated response message to the PNE A 400, the PNE B 500, and the PNE C 600 in steps 1021, 1025, and 1029, respectively.

TABLE 9

| Name | Cardinality | T | Data Type | Description |
|---|---|---|---|---|
| Personal network generation response message (PNSetupResponsetmessage) | 1 | E | | Refers to a PN generation response message in response to the PN generation request. Its sub attribute is Return |
| Response (Return) | 1 | A | Integer | Refers to a response to the PN generation request. 1. OK 2. Failure: CPNS Enabler cannot process a requested matter (e.g., internal error process occurs in the device embedding PNE). 3. Not accepted: the user of the CPNS rejects the request. |
| PNID | 0 ... 1 | A | String | Refers to a PN identifier. |
| PNGW information (PNGWInfo) | 0 ... N | E | | PNGW information Its sub attributes are PNGWID componentInfo |
| PNGW identifier (PNGWID) | 1 ... N | A | String | Refers to a PNGW identifier. |
| Module information (componentInfo) | 1 ... N | E | | Refers to a hardware component or a software component which can provide a service within the PNGW (e.g., a GPS, a microphone, a communication module/component of a mobile phone). |
| PNE information (PNEInfo) | 0 ... N | E | | Refers to PNE information (PNE A in this exemplary embodiment). Its sub attributes are PNEID componentInfo |

TABLE 9-continued

| Name | Cardinality | T | Data Type | Description |
|---|---|---|---|---|
| Device identifier (PNEID) | 1 ... N | A | String | Refers to an identifier for distinguishing devices |
| Module information (componentInfo) | 1 ... N | E | | Refers to a hardware component or a software component which can provide a service within the PNE A (e.g., a GPS, a microphone, a communication module/component of a mobile phone). |
| PNE information (PNEInfo) | 1 ... N | E | | Refers to PNE information (PNE B in this exemplary embodiment). Its sub attributes are PNEID componentInfo |
| Device identifier (PNEID) | 1 | A | String | Refers to an identifier for distinguishing devices (PNE B in this exemplary embodiment). |
| Module information (componentInfo) | 1 ... N | E | | Refers to a hardware component or a software component which can provide a service within the PNE B (e.g., a GPS, a microphone, a communication module/component of a mobile phone). |
| PNE information (PNEInfo) | 1 ... N | E | | Refers to PNE information (PNE C in this exemplary embodiment). Its sub attributes are PNEID DeviceComponent |
| Device identifier (PNEID) | 1 | E | String | Refers to an identifier for distinguishing devices (PNE C in this exemplary embodiment). |
| Module information (componentInfo) | 1 ... N | A | | Refers to a hardware component or a software component which can provide a service within the PNE C (e.g., a GPS, a microphone, a communication module/component of a mobile phone). |

The PNE A 400, the PNE B 500, and PNE 600 store the PN component list in steps 1021, 1027, and 1031, respectively.

Through the above process, the personal network 700 including the PN gateway 300, the PNE A 400, the PNE B 500, and the PNE C 600 is configured.

Figure 7A:
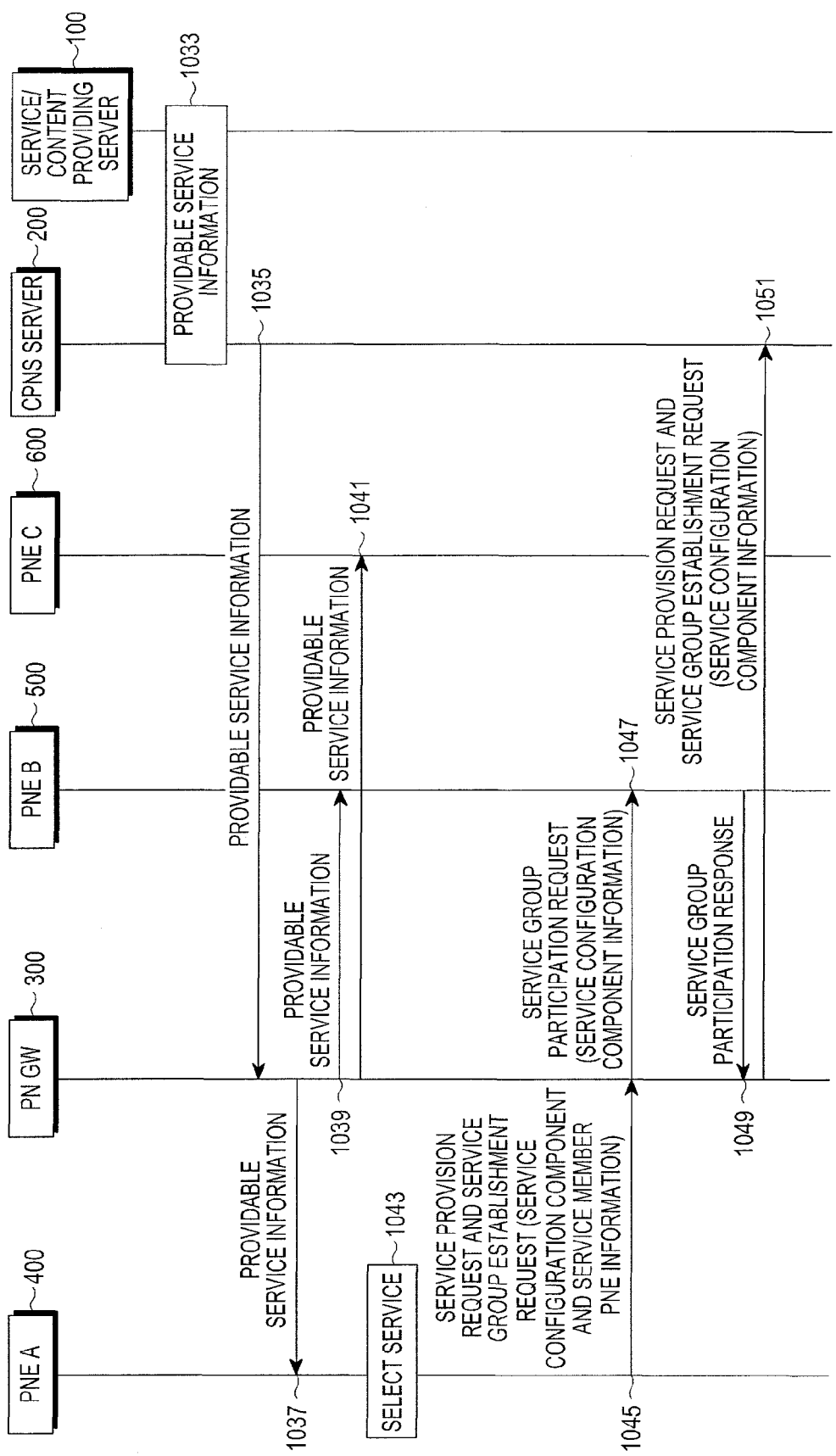
FIGS. 7A and 7B illustrate a process of establishing a service group and providing a service according to an exemplary embodiment of the present invention.
Figure 7B:
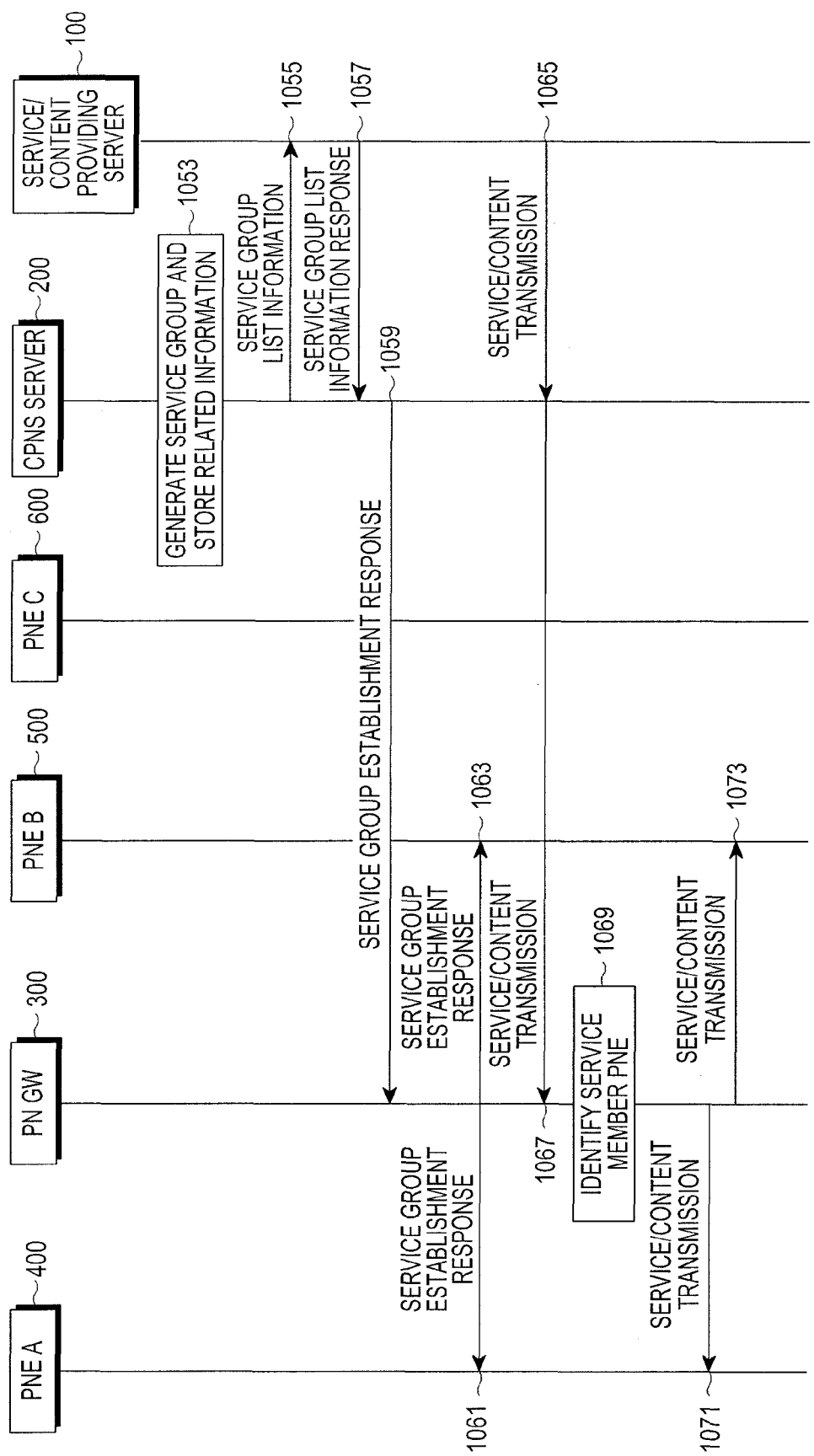

FIGS. 7A and 7B illustrate a process of establishing a service group and providing a service according to an exemplary embodiment of the present invention.

Referring to FIGS. 7A and 7B, the CPNS server 200 identifies a component based service which can be provided to the personal network 700 by using the component information of the gateway 300 and each of the PNE A 400, the PNE B 500, and the PNE C 600 obtained in step 1033. The component based service which can be provided to the personal network 700 can be determined by the CPNS server 200 or by the service/content providing server 100.

That is, the CPNS server 200 provides the component information of the PN gateway 300, the PNE A 400, the PNE B 500, and the PNE C 600 to the service/content providing server 100, and the service/content providing server 100 determines the providable component based service with reference to the provided component information and transmits the determined service to the CPNS server 200.

Alternatively, the service/content providing server 100 provides information on a required component corresponding to each of a plurality of services and contents to the CPNS server 200, and the CPNS server 200 can finally determine the component based service which can be provided to the personal network by comparing each component, which is supported by the personal network 700, received from the PN gateway 300 with the information received from the service/content providing server 100.

The CPNS server 200 identifies the providable component based service, and generates and stores a service profile corresponding to service information related to the service. The service profile includes a service indication for distinguishing the providable component based service. The service indication is used when the PNE recognizes and designates a service which the PNE desires to use later. Further, the service indication is used as a factor for making a request for the service from the service/content providing server after the CPNS server 200 generates a service group. Furthermore, the service profile includes information on the component required for using the corresponding service. For example, the service profile may include a type of component which is required or can be used for using the corresponding service, a name of the component, and a component identifier. Also, identification information on a PNE corresponding to the component may be included. When a separate application is required for using the corresponding service, the service profile includes additional application information on whether the application is required to be installed. Further, the service profile may include the corresponding application.

For example, the PNE connected to the personal network may be a television or a stereo music reproducing apparatus, and the PN gateway may be a smart phone. At this time, the television includes a display module and a speaker module as the hardware component, and includes a reproduction application capable of reproducing a dynamic image as the software component therein. Further, it is assumed that the stereo music reproducing apparatus includes the speaker module and the smart phone includes the above-mentioned hardware components and software components.

In this case, a service which can be provided to the personal network may include, for example, a dynamic image service and an internet web service. The dynamic image service can be provided through the speaker module of the stereo music reproducing apparatus and the display module and the speaker module of the television. The interne web service can be provided through a web browser application and a touch panel module of the smart phone and the display module of the television.

Accordingly, the service profile refers to a providable service list and includes the dynamic image service and the internet web service. Further, the service profile includes the dynamic image reproducing application of the smart phone, the speaker module of the stereo music reproducing apparatus, and the display module and the speaker module of the television as component information used for the dynamic image service, and includes the web browser application and the touch panel module of the smart phone, and the display module of the television. The CPNS server 200 configures and stores the service profile, and then transmits the service profile to the PNE registered in the CPNS server 200 or PNEs to be registered in the CPNS server 200 through the PN gateway 300 by using a service guide message. That is, the CPNS server 200 transmits service information to the PN gateway 300 in step 1035.

The PN gateway 300 transmits the service guide message to the PNE A 400, the PNE B 500, and the PNE C 600 in steps 1037, 1039, and 1041, respectively.

The PNE A 400 having received the service guide message can provide the service profile to the user by displaying the service guide message. The user identifies the service list included in the service profile and then can select a particular service. Further, the user can make a request for a service group establishment to receive the particular service.

The selection of the service can be achieved in various manners. For example, a service and a component required for executing the service are fixedly designated, and the user can select only a service type.

Alternatively, when there are components required for executing the particular service such as a component A, a component B, and a component C, and there are a plurality of PNEs including the component C in the personal network 700, the user can select a desired PNE from the plurality of PNEs in selecting the particular service because a list of the plurality of PNEs is included in the service profile and then provided to the user.

For example, it is assumed that the PN gateway 300 is a mobile phone, the PNE A 400 is an air conditioner, the PNE B 500 is a digital camera, the PNE C 600 is a PMP, and the particular service is an indoor monitoring service. It is assumed that the air conditioner 400 includes a component having its natural air conditioning function and a user recognition camera component for an automatic control and the digital camera 500 includes an image recognition (general camera function) component, a recording component, and a storage/reproduction component. It is assumed that the mobile phone 300 and the PMP 600 include a display component, respectively. Further, it is assumed that the indoor monitoring service can be provided through a combination of the user recognition camera component of the air conditioner 400, the image recognition component of the digital camera 500, the recording component, the storage/reproduction component, and the display component of the mobile phone 300 or the display component of the PMP 600.

In this case, the component used in the indoor monitoring service is fixedly designated as the user recognition camera component of the air conditioner 400, the image recognition component of the digital camera 500, the recording component, the storage/reproduction component, and the display component of the mobile phone 300, and may be included in the service profile.

Alternatively, the component used in the indoor monitoring service includes the user recognition camera component of the air conditioner 400, the image recognition component of the digital camera 500, the recording component, the storage/reproduction component, and the display component of the mobile phone 300, and the display component of the PMP 600, and the user can select one or more of the display component of the mobile phone 300 and the display component of the PMP 600.

The user photographing a current state of a living room by using the air conditioner 400 and the digital camera 500, and can select an indoor monitoring service providing an image photographing through the display of the mobile phone 300. Accordingly, a service group establishment request for receiving a service using the components of the air conditioner 400, the camera 500, and the mobile phone 300 can be requested.

At this time, the user can designate the apparatus (mobile phone 300 in this exemplary embodiment) to receive the corresponding service and designate another user to share the particular service, that is, the PNE to receive the corresponding service together among member PNEs to be grouped with the user into one service group. That is, the user can also select the PMP 600.

If the user desires to designate the PNE component, the user can directly input identification information on the corresponding PNE component or can select the corresponding PNE component from a list of PNE components displayed by the PNE A 400. Further, if the user desires to designate the PNE through which the user receives a service, the user can directly input identification information on the corresponding PNE or can select the corresponding PNE from a list of PNEs displayed by the PNE A 400.

In step 1043, the PNE A 400 generates a service provision request and service group generation request message according to the selection input of the user. The service provision request and service group generation request message includes an identifier of the requested service and information on a service configuration component used when the requested service is output. Further, an identifier of the PNE including the service configuration component may also be included.

The following embodiment describes a case where the user makes a request for providing a particular service and designates the PNE B 500 which is a member of a service group to receive the particular service and to send a service group establishment request for the particular service as an example. The PNE A 400 generates the service provision request and service group establishment request message including a service identifier of the particular service selected by the user, component information related to the particular service, and identifiers of member PNEs to receive or share the service, and transmits the generated service provision request and service group establishment request message to the PN gateway 300 in step 1045.

The PN gateway 300 generates and transmits a service group participation request message for inviting the PNE B 500 to the service group in step 1047. The service group participation request message includes service identifier information for informing the service for which the service group is generated and component information of the PNE A 400 and the PNE B 500 required for generating the service group.

The PNE B 500 having received the service group participation request message displays a service name corresponding to the service identifier included in the service group establishment request message, the component information of the PNE B 500 to participate in the service group, and contents indicating that there is the service group establishment participation request. The user inputs a participation acceptance or a participation rejection, and accordingly the PNE B 500 configures a service group participation response message in step 1049. The service group establishment participation response message includes information on the service group participation acceptance or rejection and information on whether a related application is installed. The PNE B 500 transmits the service group establishment participation response message to the PN gateway 300 in step 1049. At this time, it is assumed that the service group establishment response message corresponds to the participation acceptance. If the service group establishment response message corresponds to the participation rejection, the PN gateway 300 notifies the PNE A 400 of service group establishment failure.

The PN gateway 300 having received the service provision request and service group establishment request message and the service group participation response message transmits the service provision request and service group establishment request message to the CPNS server 200 in step 1051.

The CPNS server 200 having received the service provision request and service group establishment request message from the PN gateway 300 identifies the service identifier included in the received message. The CPNS server 200 checks identifiers of member PNEs included in the received service group establishment request message to identify whether the member PNEs have been registered in the CPNS server 200. When the member PNE has not been registered in the CPNS server 200, the corresponding member PNE notifies the PNE A 400 that the corresponding member PNE cannot participate in the service group. When the member PNE has registered in the CPNS server 200, the CPNS server 200 generates the service group including components of the PNE A 400 and the PNE B 500 and stores service group list information which is information on the service group in step 1053. The service group list information includes a type of service corresponding to the particular service group, an identifier of the service group, and an identifier and a component of the grouped PNE.

Further, the CPNS server 200 notifies the service/content providing server 100 providing the corresponding service that the service group has been generated, transmits the service group list information, and makes a request for the service in step 1055.

The service/content providing server 100 transmits the service group list information and a service request response message to the CPNS server 200 in step 1057.

The CPNS server 200 having received the service group list information response message informs the PNE A 400, the PNE B 500, and the PNE C 600 through the PN gateway 300 that the service group has been generated in steps 1059, 1061, and 1063, respectively.

After receiving the service request from the CPNS server 200, the service/content providing server 100 transmits the corresponding service to the PN gateway 300 through the CPNS server 200 as shown in step 1065.

The PN gateway 300 having received the service from the CPNS server 200 identifies an identifier of the corresponding service group and identifiers of member PNEs to receive and share the service in step 1069. The PN gateway 300 having identified the identifiers of the member PNEs transmits the service/content to the PNE A 400 and the PNE B 500 in steps 1071 and 1073, respectively.

Steps 1065 and 1067 may be selectively performed according to a service to be provided to the personal network 700. For example, when the service can be executed using the content stored in the CPNS server 200, step 1065 is omitted.

Further, when the service can be executed without the provision of an additional content to the personal network 700, both steps 1065 and 1067 are omitted.

Exemplary embodiments of the present invention provide the function of generating and managing the service group based on components included in the network apparatus and resources within the terminal in an environment providing the CPNS, so that the service can be provided based on neighboring components and resources within the terminal in the CPNS environment. Accordingly, exemplary embodiments of the present invention have an advantage of efficiently managing resources of the neighboring components in the CPNS environment.

The components described herein may be implemented using hardware components and software components. For example, the component may include processing devices. A processing device may be implemented using one or more general-purpose or special purpose computers, such as, for example, a processor, a controller and an arithmetic logic unit, a digital signal processor, a microcomputer, a field programmable array, a programmable logic unit, a microprocessor or any other device capable of responding to and executing instructions in a defined manner. The processing device may run an Operating System (OS) and one or more software applications that run on the OS. The processing device also may access, store, manipulate, process, and create data in response to execution of the software. For purpose of simplicity, the description of a processing device is used as singular; however, one skilled in the art will appreciated that a processing device may include multiple processing elements and multiple types of processing elements. For example, a processing device may include multiple processors or a processor and a controller. In addition, different processing configurations are possible, such a parallel processors.

The software may include a computer program, a piece of code, an instruction, or some combination thereof, for independently or collectively instructing or configuring the processing device to operate as desired. Software and data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. In particular, the software and data may be stored by one or more computer readable recording mediums. The computer readable recording medium may include any data storage device that can store data which can be thereafter read by a computer system or processing device. Examples of the computer readable recording medium include Read-Only Memory (ROM), Random-Access Memory (RAM), CD-ROMs, magnetic tapes, floppy disks, optical data storage devices. Also, functional programs, codes, and code segments for accomplishing the example embodiments disclosed herein can be easily construed by programmers skilled in the art to which the embodiments pertain based on and using the flow diagrams and block diagrams of the figures and their corresponding descriptions as provided herein.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A method of providing a service based on a component included in each network apparatus connected to a personal network by a personal network gateway apparatus supporting a Converged Personal Network Service (CPNS), the method comprising:
    configuring, by the personal network gateway apparatus, a personal network including one or more apparatuses paired with the gateway apparatus, wherein the configuring of the personal network comprises collecting, by the personal network gateway apparatus, information on a hardware component included in the one or more apparatuses and information on a software component indicating an application or content stored in the one or more apparatuses;
    generating, by the personal network gateway apparatus, an inventory including information on a hardware component included in the personal network gateway apparatus, information on a software component stored in the personal gateway apparatus, and the collected information;
    transmitting, by the personal network gateway apparatus, a request message including the inventory and requesting a registration of the personal network including the one or more apparatuses to a CPNS server;
    when a response message allowing the registration of the personal network is received from the CPNS server, transmitting, by the personal network gateway apparatus, the inventory to each of the one or more apparatuses;
    receiving, by the personal network gateway apparatus, service information including a list of services that are providable by one or more of the CPNS server and a service content providing server according to information on components and software components included in the inventory, and information on a hardware component or a software component related to each of the services from the CPNS server; and
    transmitting, by the personal network gateway apparatus, the service information to each of the one or more apparatuses,
    wherein at least one of the services included in the service information includes a service for providing a dynamic image content, image data of the dynamic image content set to be output through one of the one or more apparatuses, and audio data of the dynamic image content set to be output through another of the one or more apparatuses.

2. The method as claimed in claim 1, further comprising:
    receiving a service group establishment request message including a request for providing a particular service from a particular apparatus among the one or more apparatuses, information on a hardware component or a software component related to the particular service, information on member apparatuses to receive the particular service among the one or more apparatuses, and a request for generating a service group including the particular apparatus and the member apparatus;
    identifying whether each of the member apparatuses participate in the service group;
    transmitting the service group establishment request message to the CPNS server; and
    when a service group establishment response message allowing a generation of the service group is received from the CPNS server, providing the particular service to apparatuses included in the service group,
    wherein each of the member apparatuses is an apparatus including one or more of the hardware component and the software component related to the particular service.

3. The method as claimed in claim 1, wherein the collecting of the information comprises:
    receiving a personal network generation request message including a request for generating the personal network including the one or more apparatuses and information on a hardware component or a software component of a particular apparatus from the particular apparatus among the one or more apparatuses;
    transmitting a personal network participation request message to each of remaining apparatuses of the one or more apparatuses except for the particular apparatus; and
    receiving a personal network participation response message including information on a hardware component or a software component of each of the remaining apparatuses.

4. The method as claimed in claim 1, wherein, in connection with each of the services, the service information includes information on an additional application required for executing each of the services or the additional application.

5. A personal network gateway apparatus for supporting a Converged Personal Network Service (CPNS) and for providing a service based on a component included in each network apparatus connected to a personal network, the apparatus comprising:
    a first communication unit;
    a second communication unit capable of accessing a communication network;
    one or more hardware components; and
    a network manager for, in order to configure a personal network including one or more apparatuses paired through communication supported by the first communication unit, collecting information on a hardware component included in the one or more apparatuses and information on a software component indicating an application or a content stored in the one or more apparatuses,
    generating an inventory including information on a hardware component included in the personal network gateway apparatus and a software component stored in the personal gateway apparatus, and the collected information, and storing the generated inventory in a memory, transmitting a request message including the inventory and requesting a registration of the personal network including the one or more apparatuses to a CPNS server through the second communication unit, when a response message allowing the registration of the personal network is received from the CPNS server through the second communication unit, transmitting the inventory to each of the one or more apparatuses through the first communication unit, receiving service information including a list of services that are providable by one or more of the CPNS server and a service content providing server according to information on hardware components and software components included in the inventory and information on a hardware component or a software component related to each of the services from the CPNS server through the second communication unit, and transmitting the service information to each of the one or more apparatuses through the first communication unit, wherein at least one of the services included in the service information includes a service for providing a dynamic image content, image data of the dynamic image content set to be output through one of the one or more apparatuses, and audio data of the dynamic image content set to be output through another of the one or more apparatuses.

6. The apparatus as claimed in claim 5, wherein the network manager receives a service group establishment request message including a request for providing a particular service from a particular apparatus among the one or more apparatuses, information on a hardware component or a software component related to the particular service, information on member apparatuses to receive the particular service among the one or more apparatuses, and a request for generating a service group including the particular apparatus and the member apparatus, wherein the network manager identifies whether each of the member apparatuses participate in the service group, wherein the network manager transmits the service group establishment request message to the CPNS server, and, when a service group establishment response message allowing a generation of the service group is received from the CPNS server, provides the particular service to apparatuses included in the service group, and wherein each of the member apparatuses is an apparatus including one or more of the hardware component and the software component related to the particular service.

7. The apparatus as claimed in claim 5, wherein the network manager receives a personal network generation request message including a request for generating the personal network including the one or more apparatuses and information on a hardware component or a software component of a particular apparatus from the particular apparatus among the one or more apparatuses, transmits a personal network participation request message to each of remaining apparatuses of the one or more apparatuses except for the particular apparatus, and receives a personal network participation response message including information on a hardware component or a software component of each of the remaining apparatuses.

8. The apparatus as claimed in claim 5, wherein, in connection with each of the services, the service information includes information on an additional application required for executing each of the services or the additional application.

9. A method of providing a service to network apparatuses connected to a personal network based on a component included in each of the network apparatuses by a Converged Personal Network Service (CPNS) server supporting a CPNS, the method comprising:

receiving a request message including an inventory including a request for registering a personal network including a plurality of apparatuses paired with a personal network gateway and information on hardware components included in the plurality of apparatuses and information on software components indicating applications or content stored in the plurality of apparatuses from the personal network gateway;

when an authentication for each of the plurality of apparatuses is successfully performed, storing the inventory in a memory, generating a response message allowing a registration of the personal network, and transmitting the generated response message to the personal network gateway; and transmitting service information including a list of services that are providable by one or more of the CPNS server and a service content providing server according to information on hardware components and software components included in the inventory and information on a hardware component or a software component related to each of the services to the personal network gateway, wherein at least one of the services included in the service information includes a service for providing a dynamic image content, image data of the dynamic image content set to be output through one of the plurality of apparatuses, and audio data of the dynamic image content set to be output through another of the plurality of apparatuses.

10. The method as claimed in claim 9, further comprising:
receiving a service group establishment request message including a request for providing a particular service among the list of the services, information on a hardware component or a software component related to the particular service, information on a plurality of member apparatuses to receive the particular service among the plurality of apparatuses, and a request for generating a service group including the plurality of member apparatuses from the personal network gateway apparatus;

when authentications for the plurality of member apparatuses are successfully performed, transmitting a service group establishment response message allowing a generation of the service group to the personal network gateway; and providing the particular service to the plurality of member apparatuses through the personal network gateway, wherein each of the member apparatuses is an apparatus including one or more of the hardware component and the software component related to the particular service.

11. The method as claimed in claim 9, wherein, in connection with each of the services, the service information includes information on an additional application required for executing each of the services or the additional application.

12. The method as claimed in claim 9, wherein the service information is received from a content/service providing server.

13. A Converged Personal Network Service (CPNS) server apparatus for supporting a CPNS and for providing a service to network apparatuses connected to a personal network based on a component included in each of the network apparatuses, the apparatus comprising:

a communication unit for performing communication with a personal network gateway apparatus;

a memory for storing authentication information on apparatuses subscribing to the CPNS; and a service controller for receiving a request message including an inventory including a request for registering the personal network including a plurality of apparatuses paired with the personal network gateway apparatus and information on hardware components included in the plurality of apparatuses and software components indicating applications or content stored in the plurality of apparatuses from the personal network gateway apparatus through the communication unit, when an authentication for each of the plurality of apparatuses is successfully performed with reference to the authentication information stored in the memory, storing the inventory in the memory, generating a response message allowing a registration of the personal network, transmitting the generated response message to the personal network gateway apparatus through the communication unit, and transmitting service information including a list of services that are providable by one or more of the CPNS server and a service content providing server according to information on hardware components and software components included in the inventory and information on a hardware component or a software component related to each of the services to the personal network gateway apparatus through the communication unit, wherein at least one of the services included in the service information includes a service for providing a dynamic image content, image data of the dynamic image content set to be output through one of the plurality of apparatuses, and audio data of the dynamic image content set to be output through another of the plurality of apparatuses.

14. The apparatus as claimed in claim 13, wherein the service controller receives a service group establishment request message including a request for providing a particular service among the list of the services, information on a hardware component or a software component related to the particular service, information on a plurality of member apparatuses to receive the particular service among the plurality of apparatuses, and a request for generating a service group including the plurality of member apparatuses from the personal network gateway apparatus, transmits a service group establishment response message allowing a generation of the service group to the personal network gateway apparatus when authentications for the plurality of member apparatuses are successfully performed, and provides the particular service to the plurality of member apparatuses through the personal network gateway apparatus, wherein each of the member apparatuses is an apparatus including one or more of the hardware component and the software component related to the particular service.

15. The apparatus as claimed in claim 13, wherein, in connection with each of the services, the service information includes information on an additional application required for executing each of the services or the additional application.

16. The apparatus as claimed in claim 13, wherein the service information is received from a content/service providing server.

17. A method of supporting a Converged Personal Network Service (CPNS) and providing a service based on a component included in each network apparatus connected to a personal network by electronic apparatuses connected to the personal network, the method comprising:

transmitting a request message including a request for generation the personal network including one or more apparatuses paired with the electronic apparatuses and information on a hardware component included in the electronic apparatus and a software component indicating an application or a content stored in each of the electronic apparatuses to a personal network gateway apparatus;

receiving a response message allowing a generation of the personal network and including an inventory including information on hardware components included in a plurality of electronic apparatuses connected to the personal network and software components included in the plurality of electronic apparatuses from the personal network gateway apparatus; and receiving service information including a list of services that are providable by one or more of a CPNS server and a service content providing server according to information on hardware components and software components included in the inventory and information on a hardware component or a software component related to each of the services from the personal network gateway apparatus, wherein at least one of the services included in the service information includes a service for providing a dynamic image content, image data of the dynamic image content set to be output through one of the one or more apparatuses, and audio data of the dynamic image content set to be output through another of the one or more apparatuses.

18. The method as claimed in claim 17, further comprising:
providing the service information to a user;
receiving a selection input for a particular service among the list of the services from the user;
transmitting a service group establishment request message including a request for providing the particular service, information on a hardware component or a software component related to the particular service, information on member apparatuses to receive the particular service among the plurality of electronic apparatuses, and a request for generating a service group including the electronic apparatuses and the member apparatuses to the personal network gateway apparatus; and
receiving a service group establishment response message allowing a generation of the service group from the personal network gateway apparatus, and receiving the particular service,
wherein each of the electronic apparatuses and the member apparatuses is an apparatus including one or more of the hardware component and the software component related to the particular service.

19. An electronic apparatus for supporting a Converged Personal Network Service (CPNS) and for providing a service based on a component included in each network apparatus connected to a personal network, the electronic apparatus being connected to the personal network, the apparatus comprising:
a communication unit;
one or more hardware components; and
a network connection controller for transmitting a request message including a request for generating the personal network including one or more apparatuses paired through communication supported by the communication unit and information on a hardware component included in the electronic apparatus and a software component indicating an application or a content stored in each electronic apparatus to a personal network gateway apparatus through the communication unit, receiving a response message allowing a generation of the personal network and including an inventory including information on a hardware component included in each of a plurality of electronic apparatuses connected to the personal network and a software component included in each of the plurality of electronic apparatuses from the personal network gateway apparatus, storing the inventory in a memory, receiving service information including a list of services that are providable by one or more of a CPNS server and a service content providing server according to hardware components and software components included in the inventory and information on a hardware component or a software component related to each of the services, and storing the received service information in the memory, wherein at least one of the services included in the service information includes a service for providing a dynamic image content, image data of the dynamic image content set to be output through one of the one or more apparatuses, and audio data of the dynamic image content set to be output through another of the one or more apparatuses.

20. The apparatus as claimed in claim 19, wherein the network connection controller provides the service information to a user, receives a selection input for a particular service among the list of the services from the user, transmits a service group establishment request message including a request for providing the particular service, information on a hardware component or a software component related to the particular service, information on member apparatuses to receive the particular service among the plurality of electronic apparatuses, and a request for generating a service group including the electronic apparatuses and the member apparatuses to the personal network gateway apparatus, receives a service group establishment response message allowing a generation of the service group from the personal network gateway apparatus, and receives the particular service, and wherein each of the electronic apparatuses and the member apparatuses is an apparatus including one or more of the hardware component and the software component related to the particular service.

* * * * *